(12) United States Patent
Choe et al.

(10) Patent No.: US 12,072,498 B2
(45) Date of Patent: Aug. 27, 2024

(54) ELECTRONIC DEVICE INCLUDING ANTENNA

(71) Applicant: SAMSUNG ELECTRONICS CO., LTD., Suwon-si (KR)

(72) Inventors: Jaewon Choe, Suwon-si (KR); Seunghwan Kim, Suwon-si (KR); Jaehoon Jo, Suwon-si (KR); Nakchung Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/114,405

(22) Filed: Feb. 27, 2023

(65) Prior Publication Data

US 2023/0213771 A1    Jul. 6, 2023

Related U.S. Application Data

(63) Continuation of application No. PCT/KR2022/016706, filed on Oct. 28, 2022.

(30) Foreign Application Priority Data

Nov. 25, 2021 (KR) .................. 10-2021-0164685

(51) Int. Cl.
    *G02B 27/01* (2006.01)
    *G06T 19/00* (2011.01)
(52) U.S. Cl.
    CPC ........ *G02B 27/0172* (2013.01); *G06T 19/006* (2013.01)
(58) Field of Classification Search
    CPC ........ G06Q 20/321; H01Q 1/273; H04B 1/18; H04B 1/385; G02C 11/10
    See application file for complete search history.

(56) References Cited

U.S. PATENT DOCUMENTS 9,024,830 B2    5/2015   Okajima et al.
9,143,179 B2    9/2015   Hikino
                (Continued)

FOREIGN PATENT DOCUMENTS

JP    2013030920 A    2/2013
KR    200188390 Y1    7/2000
                (Continued)

OTHER PUBLICATIONS

International Search Report and Written Opinion for International Application No. PCT/KR2022/016706; International Filing Date Oct. 28, 2022; Date of Mailing Feb. 13, 2023; 6 Pages.

*Primary Examiner* — Kevin M Nguyen
(74) *Attorney, Agent, or Firm* — CANTOR COLBURN LLP

(57) ABSTRACT

Augmented reality (AR) glasses may include a main housing configured to accommodate lenses of the AR glasses, with at least a portion of the main housing formed of a conductive member A sub-housing forms a leg of the AR glasses. A PCB is disposed in the sub-housing. A conductive hinge structure is configured to interconnect the main housing and the sub-housing such that the sub-housing is foldable with respect to the main housing. The conductive hinge structure is electrically connected to the PCB and the conductive member. A wireless communication circuit is disposed in the sub-housing and is configured to transmit and/or receive a signal of a predetermined frequency band based on an electrical path including the conductive hinge structure and the conductive member by directly feeding power to the conductive hinge structure. Various other embodiments identified through the specification are possible.

20 Claims, 15 Drawing Sheets

(56) References Cited

U.S. PATENT DOCUMENTS

| | | |
|---|---|---|
| 9,874,748 B2 | 1/2018 | Joo |
| 11,063,338 B2 | 7/2021 | Hintermann et al. |
| 11,333,905 B2 | 5/2022 | Zhang et al. |
| 11,415,818 B2 | 8/2022 | Olgun et al. |
| 2013/0044042 A1 | 2/2013 | Olsson et al. |
| 2013/0194141 A1* | 8/2013 | Okajima ................ H01Q 1/273 |
| | | 343/718 |
| 2014/0240474 A1* | 8/2014 | Kondo ................... H04B 1/385 |
| | | 348/56 |
| 2016/0204839 A1* | 7/2016 | Liu ........................ G02C 11/10 |
| | | 345/8 |
| 2017/0242276 A1 | 8/2017 | Willey |
| 2019/0033622 A1* | 1/2019 | Olgun .................... G02C 11/10 |
| 2019/0198981 A1 | 6/2019 | Moore et al. |
| 2020/0174281 A1 | 6/2020 | Gui et al. |
| 2020/0363567 A1 | 11/2020 | Kan et al. |
| 2021/0149224 A1 | 5/2021 | Zhang et al. |

FOREIGN PATENT DOCUMENTS

| | | |
|---|---|---|
| KR | 20150054419 A | 5/2015 |
| KR | 20200053606 A | 5/2020 |
| WO | 2012086619 A1 | 6/2012 |

\* cited by examiner

ELECTRONIC DEVICE INCLUDING ANTENNA

CROSS-REFERENCE TO RELATED APPLICATION(S)

This application is a continuation application, claiming priority under § 365(c), of International Application No. PCT/KR2022/016706, filed on Oct. 28, 2022, which is based on and claims the benefit of Korean patent application number 10-2021-0164685, filed on Nov. 25, 2021, in the Korean Intellectual Property Office, the disclosures of which are incorporated by reference herein in their entireties.

TECHNICAL FIELD

Various embodiments disclosed herein relate to an electronic device including an antenna.

BACKGROUND ART

An electronic device may include antenna modules which support wireless communication services of various frequency bands, such as a 3G service, a 4G service, and/or a 5G service. Meanwhile, a processor of an electronic device (e.g., a communication processor (CP)) may communicate with a base station and determine a communication method to be used in the electronic device. For example, a wireless communication circuit of an electronic device may communicate with a base station by using one or more of a 3G/4G communication method and/or a 5G communication method.

With development of technology, various types of electronic devices are being developed. Recently, wearable electronic devices that increase user convenience have come to been developed. For example, the wearable electronic devices may be configured in the form of augmented reality (AR) glasses, which are wearable by a user. The AR glasses may provide various functions to the user even in the state the user wears AR glasses. For example, AR glasses including an antenna may provide a wireless communication function to a user in the state in which the user wears AR glasses.

DISCLOSURE

Technical Problem

AR glasses may be required to be lightweight for user convenience. However, when weight reduction is required, the size of the housing of an electronic device may be reduced. Due to this, a space for mounting electronic components inside the electronic device may be limited. For example, an antenna mounting space of the electronic device may be limited.

In general, an antenna may be disposed in temples corresponding to leg frames of AR glasses. However, when an antenna is formed in temples, the antenna may be disposed close to the user's body. As the antenna is placed close to the user's body, electromagnetic waves emitted from the antenna of the AR glasses may have a negative effect on the user.

Various embodiments disclosed herein are intended to overcome the above-described problems by providing AR glasses including an antenna.

Technical Solution

Augmented reality (AR) glasses according to various embodiments disclosed herein may include: a main housing configured to accommodate lenses of the AR glasses, wherein at least a portion of the main housing is formed of a conductive member; a sub-housing forming a leg of the AR glasses; a PCB disposed in the sub-housing; a conductive hinge structure configured to interconnect the main housing and the sub-housing such that the sub-housing is folded or unfolded with respect to the main housing, wherein the conductive hinge structure is electrically connected to the PCB and the conductive member; and a wireless communication circuit disposed in the PCB, wherein the wireless communication circuit may be configured to transmit and/or receive a signal of a predetermined frequency band based on an electrical path including the conductive hinge structure and the conductive member by directly feeding power to the conductive hinge structure.

Augmented reality (AR) glasses according to various embodiments may include: a main housing configured to accommodate lenses of the AR glasses, wherein at least a portion of the main housing is formed of a conductive member; a sub-housing forming a leg of the AR glasses; a PCB disposed in the sub-housing, wherein the PCB includes a ground; a conductive hinge structure configured to interconnect the main housing and the sub-housing such that the sub-housing is folded or unfolded with respect to the main housing, wherein the conductive hinge structure is electrically connected to the PCB and the conductive member; and a wireless communication circuit disposed in the PCB, wherein the conductive hinge structure may include: a first conductive hinge structure connected to one end of the conductive member; and a second conductive hinge structure connected to another end of the conductive member and electrically connected to the ground, and wherein the wireless communication circuit may be configured to transmit and/or receive a signal of a predetermined frequency band based on an electrical path including the first conductive hinge structure, the first conductive member, and the second conductive hinge structure by directly feeding power to the first conductive hinge structure.

Advantageous Effects

According to various embodiments disclosed herein, AR glasses are capable of securing an antenna mounting space by utilizing a rim into which lenses are inserted.

In addition, according to various embodiments, because an antenna is mounted on the rim, the antenna may be disposed to be spaced apart from the user's body. This makes it possible for the AR glasses to reduce and/or block the negative influence of electromagnetic waves received by the user.

According to various embodiments, a conductive hinge is directly used in the AR glasses, so that it is possible to prevent the thickness of the hinge from increasing in the AR glasses.

In addition, various effects directly or indirectly identified through the disclosure may be provided.

DESCRIPTION OF DRAWINGS

In connection with the description of the drawings, the same or similar components may be denoted by the same or similar reference numerals.

MODE FOR INVENTION

Hereinafter, various embodiments of the disclosure will be described with reference to the accompanying drawings. However, it shall be understood that it is not intended to limit the disclosure to specific embodiments, and that the disclosure includes various modifications, equivalents, and/or alternatives of the embodiments of the disclosure.

Figure 1:
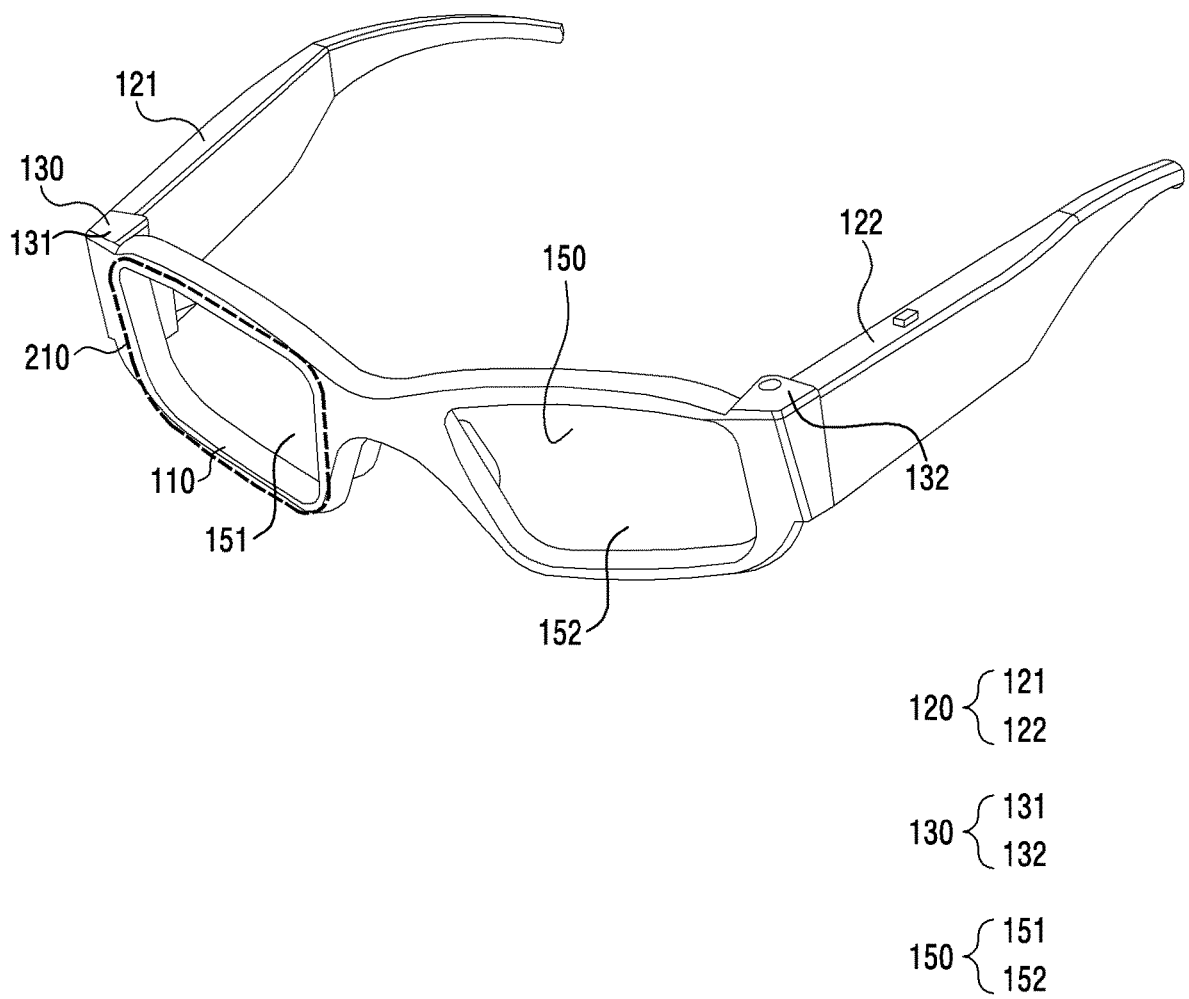
FIG. 1 is a perspective view of AR glasses according to an embodiment.

FIG. 1 is a perspective view of augmented reality (AR) glasses according to an embodiment.

Referring to FIG. 1, according to an embodiment, AR glasses 100 may include a main housing 110 and a sub-housing 120 connected to the main housing 110 via a connection part 130.

According to an embodiment, the main housing 110 may cover at least a portion of the user's face when the user wears the AR glasses 100.

According to an embodiment, the sub-housing 120 may include a first sub-housing 121 and a second sub-housing 122 configured symmetrically with the first sub-housing 121 with respect to the main housing 110. That is, as shown, the first sub-housing 121 may connect to the main housing 110 on a first side or end of the main housing 110 and the second sub-housing 122 may connect to the main housing on a second side or end of the main housing 110 opposite the first sub-housing 121.

According to an embodiment, the connection part 130 may include a first connection part 131 interconnecting the main housing 110 and the first sub-housing 121 and a second connection part 132 interconnecting the main housing 110 and the second sub-housing 122.

According to an embodiment, a printed circuit board (PCB) and/or a battery may be disposed in at least a portion of the first sub-housing 121 and/or at least a portion of the second sub-housing 122. A PCB and battery configuration in AR glasses in accordance with an embodiment are described, for example, with respect to FIG. 2.

According to an embodiment, the first connection part 131 physically interconnects the main housing 110 and the first sub-housing 121. The first connection part 131 may be configured such that the main housing 110 and the first sub-housing 121 are rotatable or pivotable about the first connection part 131. In some non-limiting embodiments, the relative rotation or adjustable angle between the first sub-housing 121 and the main housing 110 may be set within a predetermined angle range (e.g., 15 degrees to 120 degrees).

In an embodiment, the first connection part 131 is configured in a hinge structure such that the main housing 110 and the first sub-housing 121 are fixed while the first sub-housing 121 is rotatable about the first connection part 131 with respect to the main housing 110. It will be appreciated that the above description of the first connection part 131 is equally applicable to the second connection part 132 except for a direction of rotation. That is, the first and second sub-housings 121, 122 may be hingedly attached to the main housing 110 through the respective connection parts 131, 132 to fold or rotate toward the main housing 110, on the same side of the main housing 110, from a deployed or open state (shown in FIG. 1) and a closed or folded state.

According to an embodiment, lenses 150 may be disposed in the main housing 110. According to an embodiment, at least a portion of the lenses 150 may be configured as a display of the AR glasses 100. As shown, the AR glasses 100 includes a first display 151 and a second display 152, which may form or be part of the lenses 150. For example, a first display 151 for a right eye image and/or a second display 152 for a left eye image may be seated in the main housing 110. According to another embodiment, a display in which the first display 151 and the second display 152 are integrated to provide a single image may be seated in the main housing 110. It will be appreciated that if only one display 151, 152 is included, the other lens may be a normal glass or plastic lens that is not operated as a display for augmented reality functionality.

In an example, the first display 151 and the second display 152 may include one of a near-to-eye display (NED) or a head-mounted display (HMD). In another example, the first display 151 and the second display 152 may include a see-through display, which is a type of near-to-eye display. For example, at least a portion of the AR glass 100 may include a light waveguide, and one region of the light waveguide may correspond to a see-through display. The see-through display may be located very close to the user's eyes, and the user may wear the AR glasses 100 including the see-through display like lenses. As another example, a projector capable of projecting light to recognize an object through reflected light may be included in at least a portion of the AR glasses 100.

According to an embodiment, the AR glasses 100 may display an augmented reality image on or through the first display 151 and/or the second display 152. In an example, the first display 151 and/or the second display 152 may transmit light of a real environment (or real object), and when wearing the AR glasses 100, the user may recognize the light in the real environment transmitted through the first display 151 and/or the second display 152.

According to another embodiment, the first display 151 and/or the second display 152 may be understood as a transparent display capable of transmitting light of a real object and displaying an image of a virtual object at the same time. For example, the AR glasses 100 may display an image of a virtual object through the first display 151 and/or the second display 152, and the user may recognize the real object and the virtual object through the first display 151 and/or the second display 152 of the AR glasses 100. That is, the AR glasses 100 may provide augmented reality to the user.

According to an embodiment, the first display 151 and/or the second display 152 may include a transparent material such as glass or plastic.

According to an embodiment, a conductive member 210, to be described later with reference to FIGS. 2 to 5, may be disposed on at least a portion of the main housing 110.

Referring to FIG. 1, according to an embodiment, the sub-housings 120 may be configured similarly to the temples of conventional glasses. According to an embodiment, one end of the sub-housings 120 may be gently bent. According to an embodiment, because the ends of the sub-housings 120 may be gently bent, the user is capable of stably wearing the AR glasses 100 on his or her head.

The shape of the AR glasses 100 illustrated in FIG. 1 is not limited to that illustrated in FIG. 1. According to an embodiment, the AR glasses 100 may be an electronic device fabricated to be worn on the user's head. For example, the AR glasses 100 may be configured in the form of at least one of glasses and goggles, but are not limited thereto. The displays 150 may be any geometric shape used for glasses or other eyewear. Similarly the shape and structure of the housings 110, 120 may take any geometry shape or configuration, particularly configured to be worn on the head/face of a user of the AR glasses 100.

Figure 2:
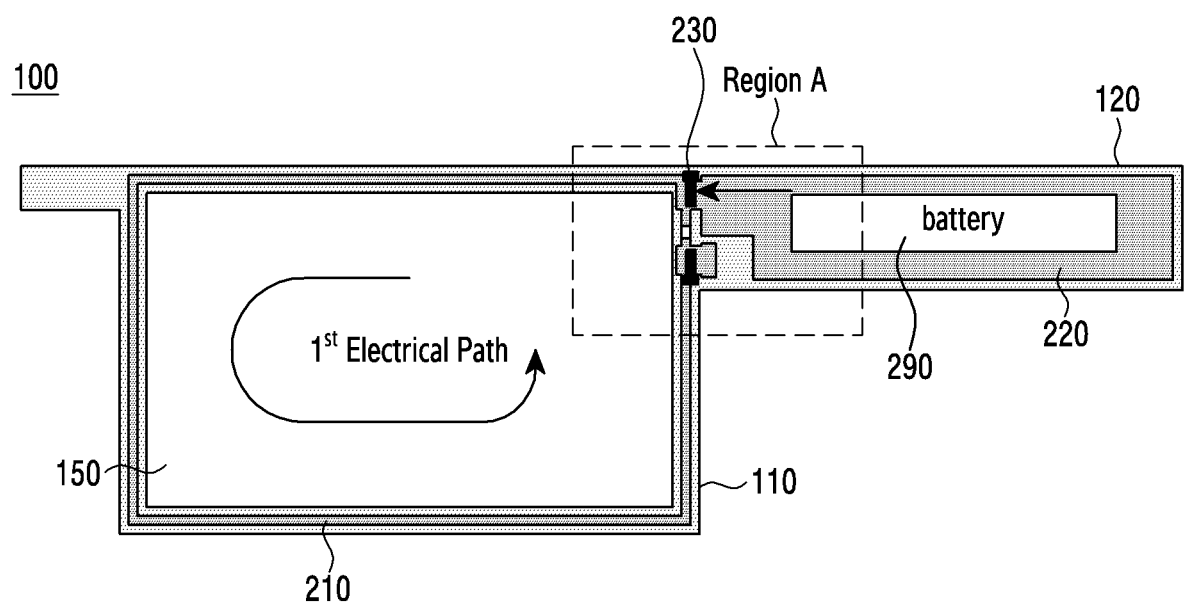
FIG. 2 is a view illustrating an inner portion of AR glasses according to an embodiment.

FIG. 2 is a view illustrating an inner portion of AR glasses according to an embodiment.

According to an embodiment, and as shown in FIG. 2, the AR glasses 100 may include a main housing 110, a conductive hinge structure 230 connected to a portion of the main housing 110, and a sub-housing 120 connected to the main housing 110 by the conductive hinge structure 230.

According to an embodiment, the conductive hinge structure 230, to be described later, may correspond to the connection part 130 described above with reference to FIG. 1. For example, the conductive hinge structure 230 may interconnect the main housing 110 and the sub-housing 120.

According to an embodiment, the main housing 110 may accommodate lenses 150 of the AR glasses 100. As described above with reference to FIG. 1, at least a portion of the lenses 150 may be configured as a display.

According to an embodiment, at least a portion of the main housing 110 may be formed of a conductive member 210. For example, the conductive member 210 may be provided to surround a lens 150 accommodated in the main housing 110. According to another embodiment, a partial region of the main housing 110 adjacent to the sub-housing 120 may be formed of a metal member, and the remaining region of the main housing 110 spaced apart from the sub-housing 120 may be formed of a non-metal member.

According to another embodiment, the main housing 110 may be formed of a non-conductive member, and the conductive member 210 may be included in a region inside the main housing 110.

According to an embodiment, the conductive member 210 may be used as an antenna radiator of the AR glasses 100. According to an embodiment, the AR glasses 100 may transmit and/or receive a signal of a predetermined frequency band via the conductive member 210 provided in the main housing 110.

According to an embodiment, the conductive member 210 may correspond to a loop antenna. However, the type of antenna corresponding to the conductive member 210 is not limited thereto. For example, the conductive member 210 may correspond to a dipole antenna, an inverted-F antenna (IFA), a monopole antenna, or other type of antenna as will be appreciated by those of skill in the art.

A specific embodiment in which the conductive member 210 is used as an antenna will be described later in detail with reference to FIGS. 6 to 12.

According to an embodiment, by using a portion of the main housing 110 as an antenna radiator (i.e., conductive member 210), the antenna may be disposed to be spaced apart from the user's body compared to the case where an antenna is disposed only in the sub-housing 120 of the AR glasses 100.

According to an embodiment, because the antenna is disposed to be spaced apart from the user's body, the influence of electromagnetic waves on the user may be reduced.

According to an embodiment, the AR glasses 100 may secure a space for mounting other electronic components inside the sub-housing 120.

According to an embodiment, the sub-housing 120 may be configured as a temple of the AR glasses 100. According to an embodiment, a plurality of electronic components may be disposed in the sub-housing 120.

According to an embodiment, the conductive hinge structure 230 may interconnect the main housing 110 and the sub-housing 120. For example, the conductive hinge structure 230 may interconnect the main housing 110 and the sub-housing 120 such that the sub-housing 120 is foldable, pivotable, or rotatable (e.g., folded or unfolded) with respect to the main housing 110. According to an embodiment, the sub-housing 120 may be connected to the main housing 110 to be folded or unfolded within a predetermined angle range (e.g., an angle between 15 degrees and 120 degrees, inclusive) with respect to the conductive hinge structure 230.

According to an embodiment, a specific embodiment of the conductive hinge structure 230 will be described in more detail with reference to FIGS. 3 to 5.

According to an embodiment, the AR glasses 100 may further include a PCB 220, a battery 290, and a wireless communication circuit (not illustrated).

According to an embodiment, the PCB 220 may be disposed inside the sub-housing 120. For example, the PCB 220 may be disposed in a portion of the sub-housing 120 adjacent to the conductive hinge structure 230. For example, the PCB 220 may be disposed in the sub-housing 120 in which the battery 290 is located, in a region outside the battery 290. According to another embodiment, the PCB 220 may be disposed over the entire region of the sub-housing 120 in which the battery 290 is not included.

According to an embodiment, a portion of the PCB 220 disposed in the sub-housing 120 may be electrically connected to the conductive hinge structure 230. For example, the PCB 220 may be directly electrically connected to the conductive hinge structure 230 without an electrical connection member (e.g., a flexible printed circuit board (FPCB) or similar structure).

According to an embodiment, because the PCB 220 is electrically connected to the conductive member 210 via the conductive hinge structure 230, the thickness of the connection part (connection part 130 in FIG. 1) of the AR glasses 100 may be reduced compared to the case of being electrically connected to the conductive member 210 by an additional electrical connection member (e.g., an FPCB). This makes it possible to reduce the size and weight of the AR glasses 100. In addition, the size of the AR glasses 100 may be reduced. Therefore, according to an embodiment, the wearing comfort of the user who uses the AR glasses may be improved.

According to an embodiment, the PCB 220 may be electrically connected to the conductive hinge structure 230.

In addition, according to an embodiment, the conductive hinge structure 230 may be electrically connected to the conductive member 210 included in the main housing 110.

According to an embodiment, the PCB 220 is electrically connected to the conductive hinge structure 230 and the conductive hinge structure 230 is electrically connected to the conductive member 210, so that a first electrical path may be provided inside the AR glasses 100.

According to an embodiment, the wireless communication circuit may be disposed in the PCB 220 and/or configured as part of the PCB 220. According to an embodiment, the wireless communication circuit disposed in the PCB 220 may directly feed power to the conductive hinge structure 230.

According to an embodiment, the PCB 220 may include a ground. In an example, the PCB 220 may include a plurality of conductive layers. For example, the ground may be provided in a first layer among the plurality of conductive layers of the PCB 220.

According to an embodiment, because the wireless communication circuit can directly feed power to the conductive hinge structure 230, the wireless communication circuit may transmit and/or receive a signal of a predetermined frequency band based on the first electrical path including the conductive hinge structure 230, the conductive member 210, and the PCB 220 including the ground.

According to an embodiment, the predetermined frequency band may include, for example, a frequency band between 2.35 GHz to 2.5 GHz. However, the range of the predetermined frequency band is not limited thereto. For example, the predetermined frequency band may alternatively or further include a frequency band, for example, within a range of 1.4 GHz to 1.6 GHz.

According to an embodiment, the battery 290 may be disposed in the sub-housing 120. According to an embodiment, the battery 290 may be electrically connected to the PCB 220 disposed in the sub-housing 120.

Figure 3:
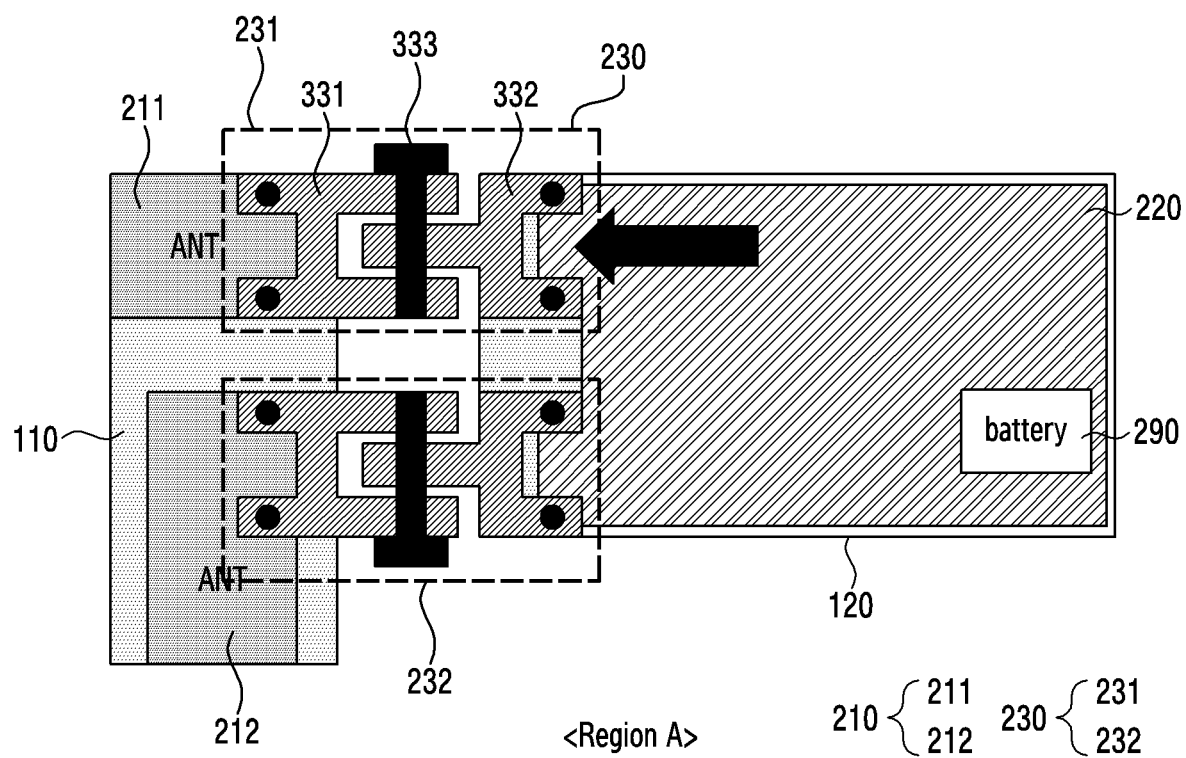
FIG. 3 is a view illustrating region A of the AR glasses of FIG. 2, according to an embodiment.

FIG. 3 is a view illustrating region A of the AR glasses of FIG. 2, according to an embodiment.

In the description of FIG. 3, features and aspects previously described with reference to FIGS. 1 and 2 will be omitted.

According to an embodiment, the main housing 110 may include at least one conductive member 210.

According to an embodiment, the main housing 110 may be formed of the conductive member 210, but is not limited thereto. For example, the main housing 110 may be formed of a non-conductive member, and a portion of the main housing 110 may include the conductive member 210.

According to an embodiment, and as shown in FIG. 3, the conductive member 210 may include a first conductive member 211 and a second conductive member 212. According to another embodiment, the conductive member 210 may include only one of the first conductive member 211 and the second conductive member 212.

According to an embodiment, the main housing 110 and the sub-housing 120 may be connected to each other by a conductive hinge structure 230.

According to an embodiment, the conductive hinge structure 230 may include a first conductive hinge structure 231 and a second conductive hinge structure 232 distinct from the first conductive hinge structure 231.

It will be appreciated that the number of conductive hinge structures 230 is not limited to the two illustrated structures 231, 232. For example, according to various embodiments, the conductive hinge structure 230 may include only the first conductive hinge structure 231, only the second conductive hinge structure 232, or may include a plurality of conductive hinge structures greater than two.

In accordance with some embodiments, the conductive hinge structures 230 may be provided symmetrically with respect to the main housing 110 of the AR glasses 100. For example, in the AR glasses 100, a first sub-housing (e.g., the first sub-housing 121 in FIG. 1) and a second sub-housing (e.g., the second sub-housing 122 in FIG. 1), and the main housing 110 may be connected to each other by the first conductive hinge structure 231 and the second conductive hinge structure 232, respectively, but the disclosure is not limited thereto.

As another example, the conductive hinge structures 230 may be provided asymmetrically with respect to the main housing 110 of the AR glasses 100. For example, the first sub-housing 121 and the main housing 110 may be connected by the first conductive hinge structure 231 and the second conductive hinge structure 232, but the second sub-housing 122 and the main housing 110 may be connected to each other only by a first conductive hinge structure 231.

According to an embodiment, the main housing 110 may be electrically connected to the first conductive hinge structure 231 and/or the second conductive hinge structure 232.

Referring to FIGS. 2 and 3, according to an embodiment, the first conductive member 211 may be electrically connected to the first conductive hinge structure 231. In addition, according to an embodiment and as shown in FIG. 3, the second conductive member 212 may be electrically connected to the second conductive hinge structure 232.

According to an embodiment, the sub-housing 120 may be electrically connected to the first conductive hinge structure 231 and the second conductive hinge structure 232. For example, a portion of the sub-housing 120 may be electrically connected to the first conductive hinge structure 231, and another region of the sub-housing 120 may be electrically connected to the second conductive hinge structure 232.

According to an embodiment, as the conductive hinge structure 230 and the sub-housing 120 are electrically connected to each other, the AR glasses 100 may transmit and/or receive a signal of a predetermined frequency band based on an electrical path including the conductive hinge structure 230, the conductive member 210, and the PCB 220 disposed in the sub-housing 120.

For example, the wireless communication circuit in the PCB 220 of the AR glasses 100 may transmit and/or receive a signal of a predetermined frequency band based on an electrical path including the conductive hinge structure 230, the conductive member 210, and the PCB 220.

According to an embodiment, the wireless communication circuit provided in the PCB 220 may directly feed power to the first conductive hinge structure 231. According to an embodiment, by directly feeding power to the first conductive hinge structure 231, the wireless communication circuit may transmit and/or receive a signal of a predetermined frequency band based on a first electrical path including the first conductive hinge structure 231, the first conductive member 211, and the second conductive hinge structure 232.

According to an embodiment, when the conductive member 210 includes the first conductive member 211 and the second conductive member 212, the wireless communication circuit may transmit and/or receive a signal of a predetermined frequency band based on a first electrical path provided by the first conductive member 211 and a second electrical path provided by the second conductive member 212.

According to an embodiment, by directly feeding power to the first conductive hinge structure 231, the wireless communication circuit provided in the PCB 220 may transmit and/or receive a signal of a first frequency band based on a first electrical path including the first conductive hinge structure 231 and the first conductive member 211.

According to an embodiment, by directly feeding power to the second conductive hinge structure 232, the wireless communication circuit provided in the PCB 220 may transmit and/or receive a signal of a second frequency band based on a second electrical path including the second conductive hinge structure 232 and the second conductive member 212.

In an example, the first frequency band may correspond to a frequency of a first range. In an example, the second frequency band may correspond to a frequency of a second range. According to some embodiments, the frequency ranges of the first and second frequency bands may be different from each other. For example, according to an embodiment, the frequency of the first range may be higher than the frequency of the second range (or vice versa).

In a non-limiting example, the first range may correspond to a range within 2.3 GHz to 2.6 GHz. The second range may have a smaller value or range than the first range. For example, the second range may correspond to a range of 1.4 GHz to 1.6 GHz which is smaller than the first range. It will be appreciated that the range of the frequency bands is not limited to these specific examples and each of the first and second frequency ranges may be different than the ranges described herein.

According to an embodiment, the first conductive hinge structure 231 may include a first conductive connection structure 331, a second conductive connection structure 332, and a conductive fastening member 333.

According to an embodiment, the first conductive connection structure 331 of the first conductive hinge structure 231 may be connected to the main housing 110. In some embodiments, the first conductive connection structure 331 may be directly connected to the first conductive member 211 in the main housing 110. According to an embodiment, the second conductive connection structure 332 of the first conductive hinge structure 231 may be connected to the sub-housing 120. For example, in some embodiments, the second conductive connection structure 332 may be directly connected to the PCB 220 in the sub-housing 120.

According to an embodiment, the first conductive connection structure 331 and the second conductive connection structure 332 may be connected to each other. For example, the first conductive connection structure 331 and the second conductive connection structure 332 may be connected to each other by the conductive fastening member 333. For example, referring to FIG. 3, the conductive fastening member 333 may be disposed between the first conductive connection structure 331 and the second conductive connection structure 332 to tie the first conductive connection structure 331 and the second conductive connection structure 332 to each other.

According to an embodiment, the first conductive connection structure 331 may include a first hole. According to an embodiment, the first hole may be formed in a first direction (e.g., the +z direction or the −z direction, as shown in FIG. 4).

According to an embodiment, the second conductive connection structure 332 may include a second hole.

According to an embodiment, the second hole may be formed in the first direction (e.g., the +z direction or the −z direction).

According to an embodiment, the first hole and the second hole may be aligned in the first direction. According to an embodiment, because the first hole and the second hole are aligned in the first direction, the conductive fastening member 333 may pass through the holes and tie the first conductive connection structure 331 and the second conductive connection structure 332 to each other.

According to an embodiment, the conductive fastening member 333 may include a protrusion. According to an embodiment, the protrusion of the conductive fastening member 333 may be inserted into the first hole of the first conductive connection structure 331. In addition, the protrusion of the conductive fastening member 333 may be inserted into the second hole of the second conductive connection structure 332.

According to an embodiment, the conductive fastening member 333 may be inserted into the first and second holes to tie the first conductive connection structure 331 and the second conductive connection structure 332 to each other. The above description of the first conductive hinge structure 231 is equally applicable to the second conductive hinge structure 232.

Specific embodiments related to the first conductive connection structure 331, the second conductive connection structure 332, and the conductive fastening member 333 will be described with reference to FIGS. 4A-4C and FIG. 5.

According to an embodiment, the AR glasses 100 may transmit and/or receive a signal of a predetermined frequency band based on an electrical path including the conductive member 210 of the main housing 110, the conductive hinge structure 230, and the PCB 220 of the sub-housing 120.

According to an embodiment, the first conductive connection structure 331 of the first conductive hinge structure 231 may be electrically connected to the first conductive member 211 of the main housing 110. According to an embodiment, the second conductive connection structure 332 of the first conductive hinge structure 231 may be electrically connected to the PCB 220 of the sub-housing 120.

According to an embodiment, the wireless communication circuit disposed in the PCB 220 may directly feed power to the second conductive connection structure 332. According to an embodiment, by directly feeding power to the second conductive hinge structure 332, the wireless communication circuit may transmit and/or receive a signal of a predetermined frequency band based on the electrical path further including the second conductive hinge structure 332, the conductive fastening member 333, and the first conductive connection structure 331.

According to an embodiment, by further using the electrical path including the first conductive connection structure 331, the second conductive connection structure 332, and the conductive fastening member 333, the wireless communication circuit of the AR glasses 100 may transmit and/or receive a signal of a predetermined frequency band without an additional electrical connection member (e.g., an FPCB).

According to an embodiment, the thickness of the connection part 130 of the AR glasses 100 may be reduced by not additionally mounting the electrical connection member. In addition, the weight of the AR glasses 100 may be reduced. Accordingly, according to an embodiment, the user's experience using the AR glasses 100 may increase.

Figure 4A:
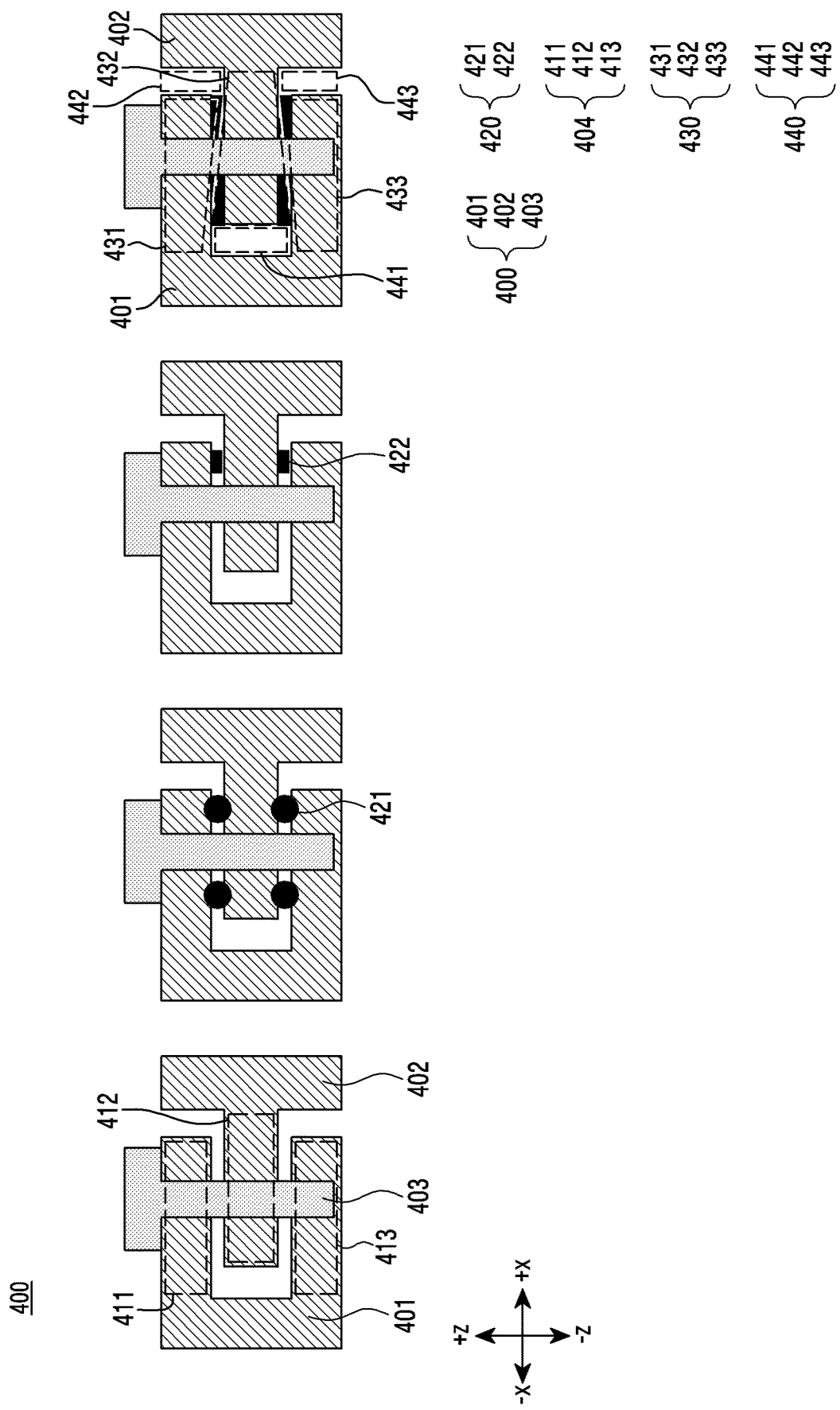
FIG. 4A is a view illustrating a conductive hinge structure of AR glasses, according to an embodiment.

FIG. 4A includes a series of non-limiting configurations illustrating conductive hinge structures of AR glasses, according to one or more embodiments. The conductive hinge structures may be generally referred to as conductive hinge structure 400.

According to an embodiment, the conductive hinge structure 400 (first structure) of FIG. 4A may refer to the conductive hinge structure 230 of FIGS. 2 and 3. For example, the first conductive connection structure 401, the second conductive connection structure 402, and the conductive fastening member 403 of the conductive hinge structure 400 may refer to the first conductive connection structure 331, the second conductive connection structure 332, and the conductive fastening member 333 of the first conductive hinge structure 231 of FIG. 3.

According to an embodiment, at least one tenon 404 may be provided in the first conductive connection structure 401 and the second conductive connection structure 402. According to an embodiment, the tenon 404 may include a connection member including a hole.

According to an embodiment, the first conductive connection structure 401 may include a first number of tenons 404, and the second conductive connection structure 402 may include a second number of tenons 404.

According to an embodiment, the first number of tenons 404 in the first conductive connection structure 401 may be greater than the second number of tenons 404 in the second conductive connection structure 402. For example, as shown in FIG. 4A, the first conductive connection structure 401 may include a first tenon 411 and a third tenon 413, and the second conductive connection structure 402 includes a second tenon 412.

However, the number of tenons 404 is not limited thereto. For example, the first conductive connection structure 401 may include only the first tenon 411, and the second conductive connection structure 402 may further include the second tenon 412 and/or a fourth tenon (not illustrated).

According to an embodiment, because there is a difference in the number of tenons 404 between the first conductive connection structure 401 and the second conductive connection structure 402, the first conductive connection structure 401 and the second conductive connection structure 402 may be coupled to each other.

According to an embodiment, because the number of tenons 404 of the first conductive connection structure 401 and the number of tenons 404 of the second conductive connection structure 402 are different, the first conductive connection structure 401 may be coupled to the second conductive connection structure 402. For example, by inserting the second tenon 412 of the second conductive connection structure 402 into a space formed between the first tenon 411 and the third tenon 413 of the first conductive connection structure 401, the first conductive connection structure 401 and the second conductive connection structure 402 may be coupled.

According to an embodiment, the first conductive connection structure 401 and the second conductive connection structure 402 may be connected to each other by the conductive fastening member 403. In an example, by inserting the conductive fastening member 403 into the holes formed in the first conductive connection structure 401 and the second conductive connection structure 402, it is possible to interconnect the first conductive connection structure 401 and the second conductive connection structure 402. For example, by inserting the conductive fastening member 403 into the holes formed in the first tenon 411 and the third tenon 413 of the first conductive connection structure 401 and the hole formed in the second tenon 412 of the second conductive connection structure 402, it is possible to interconnect the first conductive connection structure 401 and the second conductive connection structure 402.

According to an embodiment, the conductive fastening member 403 may include, without limitation, a screw, a rivet, and/or a washer.

However, the type of the conductive fastening member 403 is not limited thereto. For example, the conductive fastening member 403 may include a bolt or other structural/mechanical connection element. Alternatively, in an example, the conductive fastening member 403 may be formed by soldering.

According to an embodiment, the conductive hinge structure 400 may additionally or alternatively include a conductive tie member 420. According to an embodiment, the conductive binding member 420 included in the conductive hinge structure 400 may electrically connect the PCB (220 in FIG. 3) in the sub-housing (120 in FIG. 3) and the conductive member (210 in FIG. 3) in the main housing (110 in FIG. 3) to each other.

According to an embodiment, the conductive tie member 420 may be configured as a ball bearing 421 (second structure) and/or a protrusion 422 (third structure).

According to an embodiment, the ball bearing 421 of the conductive hinge structure 400b may be disposed between the first tenon 411 and the third tenon 413 of the first conductive connection structure 401 and the second tenon 412 of the second conductive connection structure 402. According to an embodiment, the ball bearing 421 may be disposed to surround the conductive fastening member 403.

According to an embodiment, because the ball bearing 421 surrounds the conductive fastening member 403 between the first conductive connection structure 401 and the second conductive connection structure 402, the conductive member 210 may be electrically connected to the PCB more strongly than that in the case where the ball bearing 421 is not included.

According to an embodiment, protrusions 422 may be provided on portions of the first conductive connection structure 401 and the second conductive connection structure 402. For example, a protrusion 422 extending in a first direction (e.g., the +z direction or the −z direction) may be provided on a portion of the first tenon 411 of the first conductive connection structure 401. In an example, the protrusion 422 may be provided to extend from a portion of the first tenon 411 adjacent to the hole into which the conductive fastening member 403 is inserted. The above description of the protrusion 422 is equally applicable to the third tenon 413 of the first conductive connection structure 401 and/or the second tenon 412 of the second conductive connection structure 402.

According to another embodiment, the first conductive connection structure 401 and the second conductive connection structure 402 may include a variable tenon 430 the thickness of which gradually changes (fourth structure), as shown with respect to the conductive hinge structure 400d of FIG. 4A. In an example, the variable tenon 430 may include a first variable tenon 431, a second variable tenon 432, and a third variable tenon 433.

According to an embodiment, the thickness of the variable tenon 430 may gradually change. For example, the thickness of each variable tenon 430 may change in the direction of the first direction (e.g., +z direction or the −z direction). In an example, the thicknesses of the first variable tenon 431 and the third variable tenon 433 of the first conductive connection structure 401 may gradually change as the tenons 431, 433 extend toward the second conductive connection structure 402. For example, the thicknesses of the first variable tenon 431 and the third variable tenon 433 of the first conductive connection structure 401 may gradually increase as the tenons 431, 432 extend toward the second conductive connection structure 402.

In an example, the thickness of the second variable tenon 432 of the second conductive connection structure 402 may gradually change as the tenon 432 extends toward the first conductive connection structure 401. For example, the thickness of the second variable tenon 432 of the second conductive connection structure 402 may gradually increase as the tenon 432 extends toward the first conductive connection structure 401.

According to an embodiment, the first conductive connection structure 401 and the second conductive connection structure 402 may include one or more recesses 440. In an example, the recesses 440 may include a first recess 441, a second recess 442, and a third recess 443. For example, the first recess 441 may be provided in a region of the first conductive connection structure 401 between the first variable tenon 431 and the third variable tenon 433 (in the first direction). In addition, for example, the second recess 442 may be formed in the second variable tenon 432 in the first direction (e.g., the +z direction), and the third recess 443 may be formed in the second variable tenon 432 in the second direction (e.g., the −z direction) opposite to the first direction. Stated another way, the second recess 442 may be defined between the first variable tenon 431 and the second conductive structure 402 (in the x direction) and the third recess 443 may be defined between the third variable tenon 433 and the second conductive structure 402 (in the x direction) In other words, according to an embodiment, the second variable tenon 432 may be provided between the second recess 442 and the third recess 443.

According to an embodiment, the tenons 404 of the first conductive connection structure 401 and the second conductive connection structure 402 may be seated in respective corresponding recesses 440. For example, the first variable tenon 431 of the first conductive connection structure 401 may be seated in the second recess 442 of the second conductive connection structure 402, and the third variable tenon 433 of the first conductive connection structure 401 may be seated in the third recess 443 of the second conductive connection structure 402. According to an embodiment, the second variable tenon 432 of the second conductive connection structure 402 may be seated in the first recess 441 of the first conductive connection structure 401.

According to an embodiment, because the variable tenons 430 having a changing thickness are seated in respective corresponding recesses 440, the first conductive connection structure 401 and the second conductive connection structure 402 may be coupled more strongly than the conductive connection structures including tenons 404 having a constant thickness. For example, because the first variable tenon 431, the second variable tenon 432, and the third variable tenon 433 are seated in the second recess 442, the first recess 441, and the third recess 443, the first conductive connection structure 401 and the second conductive connection structure 402 may be coupled more strongly than the conductive connection structures including the tenons 404 having a constant thickness.

According to an embodiment, the conductive tie member 420 may correspond to an electrical path through which a wireless communication circuit transmits and/or receives a signal of a predetermined frequency band.

According to an embodiment, by feeding power to the second conductive connection structure 402, the wireless communication circuit disposed in the PCB 220 may transmit and/or receive a signal of a predetermined frequency band based on the electrical path including the conductive tie member 420, the conductive fastening member 403, the first conductive connection structure 401, and the conductive member 210.

Figure 4B:
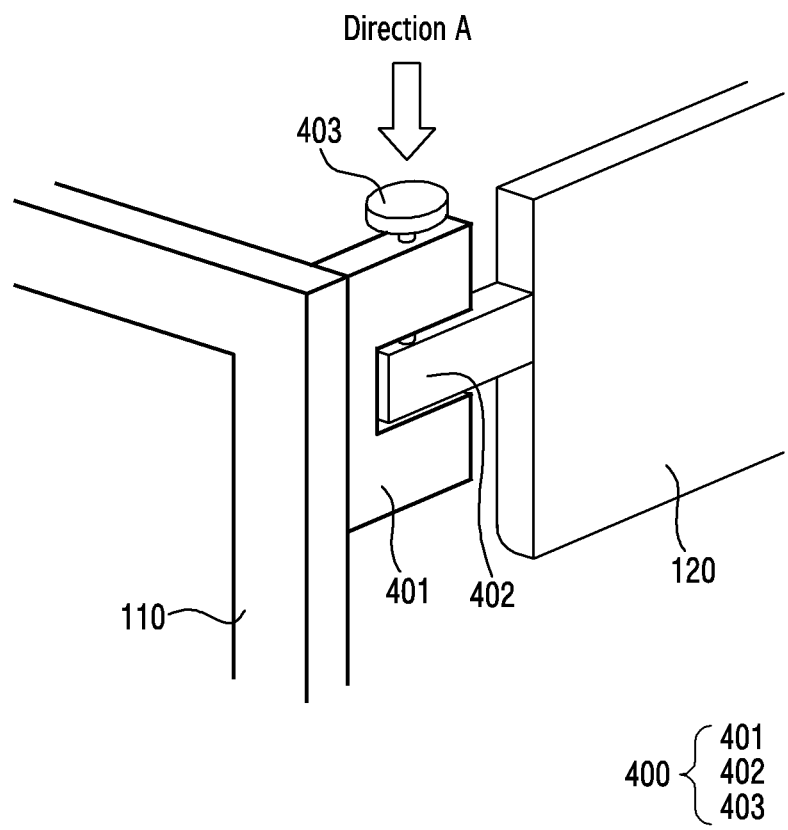
FIG. 4B is a perspective view illustrating a conductive hinge structure of AR glasses, according to an embodiment.

FIG. 4B is a perspective view of the a conductive hinge structure of FIG. 4A, according to an embodiment.

Referring to FIG. 4B according to an embodiment, the main housing 110 and the sub-housing 120 may be connected by the first conductive connection structure 401 and the second conductive connection structure 402 of the conductive hinge structure 400. In an example, the first conductive connection structure 401 of the conductive hinge structure 400 may be connected to the main housing 110, and the second conductive connection structure 402 of the conductive hinge structure 400 may be connected to the sub-housing 120. For example, by coupling the conductive fastening member 403 by the first conductive connection structure 401 and the second conductive connection structure 402 of the conductive hinge structure 400, the main housing 110 and the sub-housing 120 may be connected to each other.

Figure 4C:
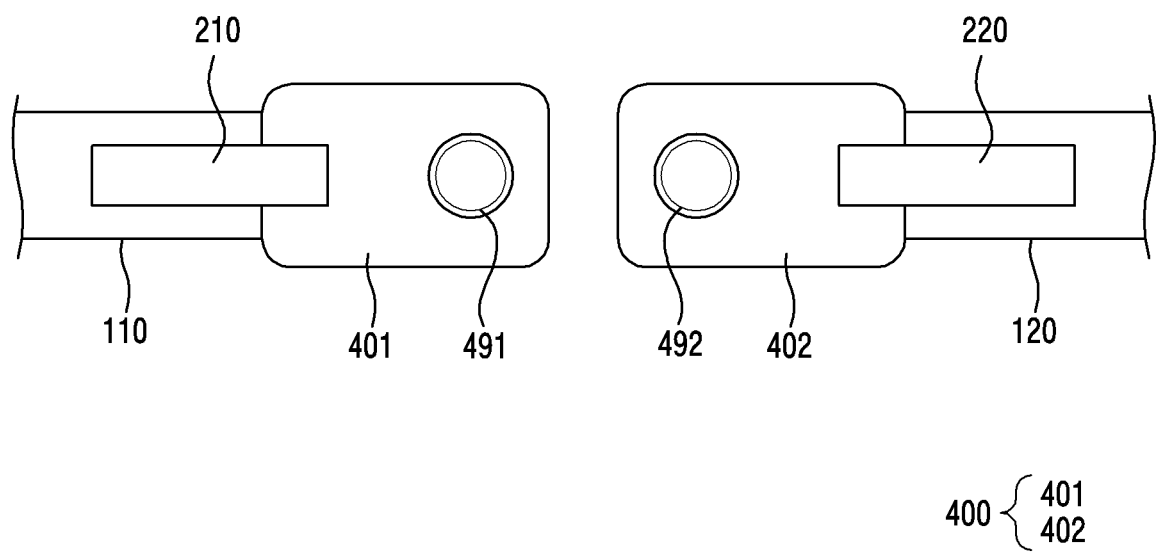
FIG. 4C is a view illustrating a conductive hinge structure in a direction A of FIG. 4B, according to an embodiment.

FIG. 4C is a view illustrating a conductive hinge structure in a direction A of FIG. 4B, according to an embodiment.

FIG. 4C, according to an embodiment, is a view illustrating the conductive hinge structure 400 viewed in the direction A of FIG. 4B, in the state in which the first conductive connection structure 401 and the second conductive connection structure 402 are not coupled. In other words, FIG. 4C is a view illustrating the state in which the main housing 110 and the sub-housing 120 are separated. As such, the conductive fastening member 403 is not illustrated in the view of FIG. 4C.

According to an embodiment, the main housing 110 may include a conductive member 210, and the sub-housing 120 may include a PCB 220.

According to an embodiment, the first conductive connection structure 401 connected to the main housing 110 and the second conductive connection structure 402 connected to the sub-housing 120 may each include a hole 491, 492. In an example, the first conductive connection structure 401 may include a first hole 491, and the second conductive connection structure 402 may include a second hole 492. For example, a first hole 491 may be formed in each of the first tenon 411 and the third tenon 413 of the first conductive connection structure 401, and a second hole 492 may be formed in the second tenon 412 of the second conductive connection structure 402.

According to an embodiment, the first conductive connection structure 401 and the second conductive connection structure 402 may be coupled to each other by the holes 491, 492 and the conductive fastening member 403 shown in FIG. 4B. For example, by inserting the conductive fastening member 403 into the first holes 491 of the first conductive connection structure 401 and the second hole 492 of the second conductive connection structure 402, the first conductive connection structure 401 and the second conductive connection structure 402 may be coupled.

Figure 5:
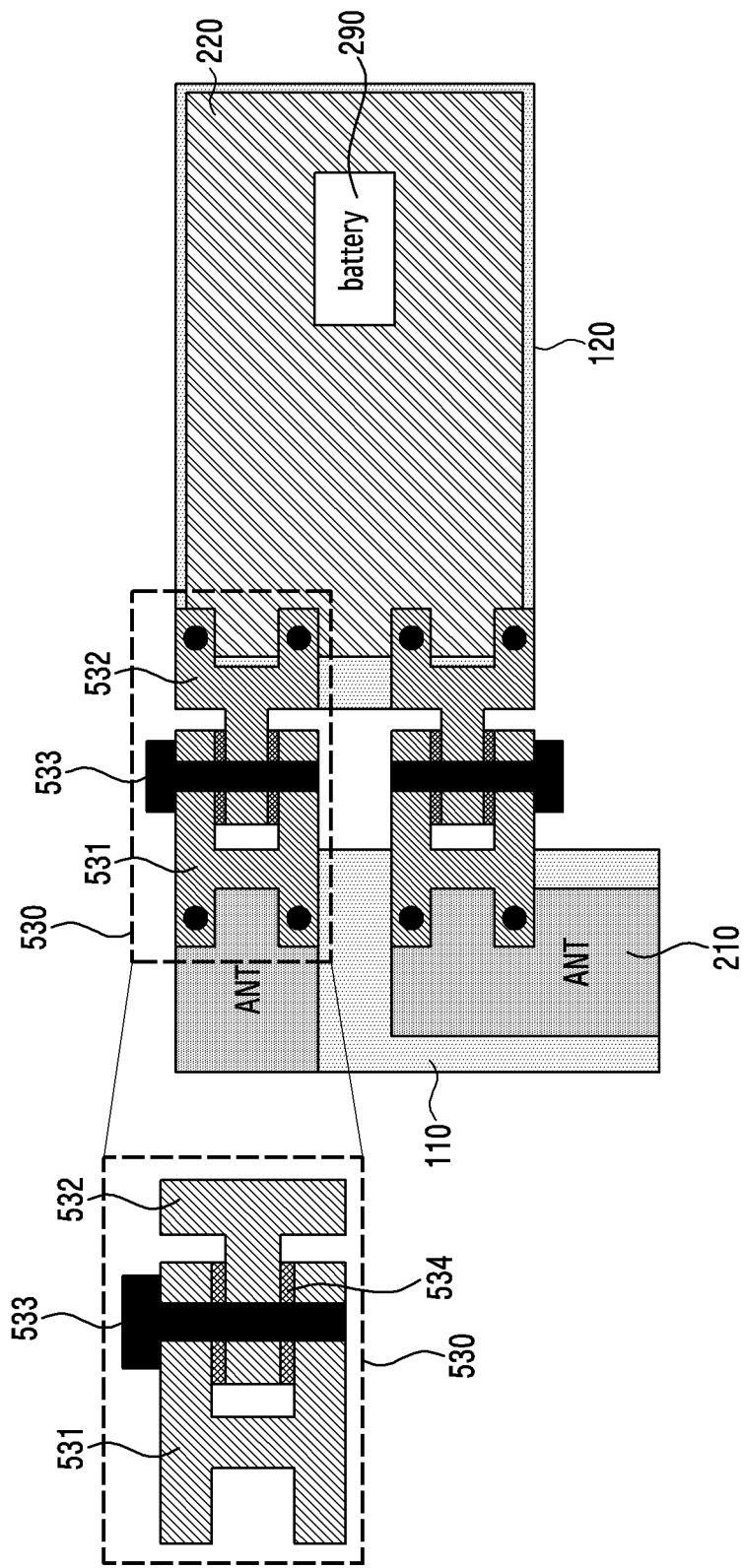
FIG. 5 is a view illustrating an inner portion of AR glasses according to an embodiment.

FIG. 5 is a view illustrating an inner portion of AR glasses according to an embodiment.

Regarding FIG. 5, a description of features and aspects previously described with reference to FIGS. 1 to 4C will be omitted.

According to an embodiment, the main housing 110 may be connected to the sub-housing 120 by a conductive hinge structure 530.

According to an embodiment, the conductive hinge structure 530 may include a first conductive connection structure 531, a second conductive connection structure 532, and a non-conductive connection member 533.

According to an embodiment, the first conductive connection structure 531 may be electrically connected to the main housing 110 and/or the conductive member 210.

According to an embodiment, the second conductive connection structure 532 may be electrically connected to the sub-housing 120 and/or the PCB 220.

According to an embodiment, the non-conductive connection member 533 may be disposed between the first conductive connection structure 531 and the second conductive connection structure 532. For example, the non-conductive connection member 533 may be disposed in a region in which the first conductive connection structure 531 and the second conductive connection structure 532 come into contact with each other.

According to an embodiment, the non-conductive connection member 533 may include a non-conductive screw or other type of fastener. Alternatively, according to an embodiment, the non-conductive connection member 533 may include a non-conductive ball bearing or other structure, such as those described above and variations thereon and/or other coupling means and mechanisms.

It will be appreciated that the non-conductive connection member 533 is not limited to the illustrative configuration shown in FIG. 5. For example, according to another embodiment, the holes formed in the tenons of the first conductive connection structure 531 and the second conductive connection structure 532 may be insulated.

According to another embodiment, the non-conductive connection member 533 may include a dielectric material 534 and/or the dielectric material 534 may be arranged about the non-conductive connection member 533. According to an embodiment, the dielectric material 534 may be disposed between the first conductive connection structure 531 and the second conductive connection structure 532. According to an embodiment, the dielectric material 534 may be disposed in a first region formed between the first tenons of the first conductive connection structure 531 and the second tenon of the second conductive connection structure 532.

According to an embodiment, by disposing the non-conductive connection member 533 and the dielectric material 534, the first conductive connection structure 531 may not be electrically directly connected to the second conductive connection structure 532.

However, according to an embodiment, by disposing the first conductive connection structure 531 and the second conductive connection structure 532 adjacent to each other, the first conductive connection structure 531 and the second conductive connection structure 532 may be coupled and electrically connected to each other through the dielectric material 534.

According to an embodiment, because the first conductive connection structure 531 and the second conductive connection structure 532 are coupled and electrically connected each other through the dielectric material 534, the AR glasses 100 may transmit and/or receive signals of multiple frequency bands.

For example, by directly feeding power to the second conductive connection structure 532, the wireless communication circuit of the AR glasses 100 may transmit and/or receive a signal of a predetermined frequency band based on an electrical path including the second conductive connection structure 532, the first conductive connection structure 531 coupled and electrically connected to the second conductive connection structure, and the conductive member 210 (e.g., inclusive of the dielectric material 534).

Figure 6:
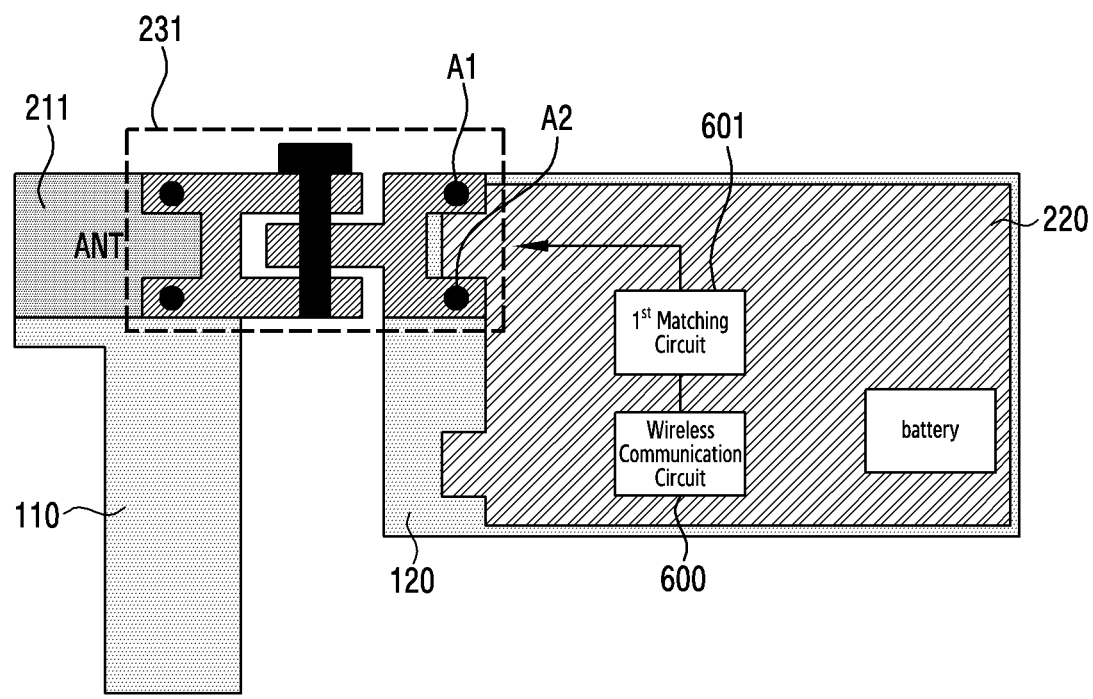
FIG. 6 is a view illustrating region A of AR glasses as shown in FIG. 2 according to another embodiment.

FIG. 6 is a view illustrating region A indicated in FIG. 2 of AR glasses according to another embodiment.

Referring to FIG. 6, in the AR glasses 100 according to an embodiment, the second conductive hinge structure 232 is omitted, unlike the AR glasses illustrated in FIG. 3.

According to an embodiment, the AR glasses 100 shown in FIG. 6 may include a main housing 110 including a first conductive member 211, a sub-housing 120 including a PCB 220, and a first conductive hinge structure 231 interconnecting the main housing 110 and the sub-housing 120.

According to an embodiment, the AR glasses 100 may receive a signal of a predetermined frequency band based on a first electrical path including the first conductive member 211 of the main housing 110, the first conductive hinge structure 231, and the PCB 220 of the sub-housing 120.

According to an embodiment, the first conductive member 211 may correspond to a monopole antenna. As shown in FIG. 6, a wireless communication circuit 600 and a first matching circuit 601 may be disposed on the PCB 220. In an example, the wireless communication circuit 600 may be electrically connected to the first conductive hinge structure 231 via the first matching circuit 601.

According to an embodiment, the wireless communication circuit 600 may feed power to a first point A1 of the first conductive hinge structure 231 via the first matching circuit 601, and the wireless communication circuit 600 may transmit and/or receive a signal of a predetermined frequency band based on a first electrical path including the first conductive hinge structure 231 and/or the first conductive member 211.

According to an embodiment, the first matching circuit 601 may perform impedance matching of an antenna (e.g., a monopole antenna) including the first conductive member 211. For example, the first matching circuit 601 may include at least one lumped element (e.g., a capacitor or an inductor). In an example, the first matching circuit 601 may perform impedance matching through the at least one lumped element in response to the signal of the predetermined frequency band transmitted and/or received by the antenna including the first conductive member 211.

In FIG. 6, the point to which the wireless communication circuit 600 feeds power has been described as the first point A1 of the first conductive hinge structure 231, but this is only an example for convenience of description. The wireless communication circuit 600 may transmit and/or receive a signal of a predetermined frequency band by feeding power to various points of the first conductive hinge structure 231. For example, the wireless communication circuit 600 may transmit and/or receive a signal of a predetermined frequency band based on a second electrical path by feeding power to a second point A2 of the first conductive hinge structure 231 by using the first matching circuit 601.

Figure 7:
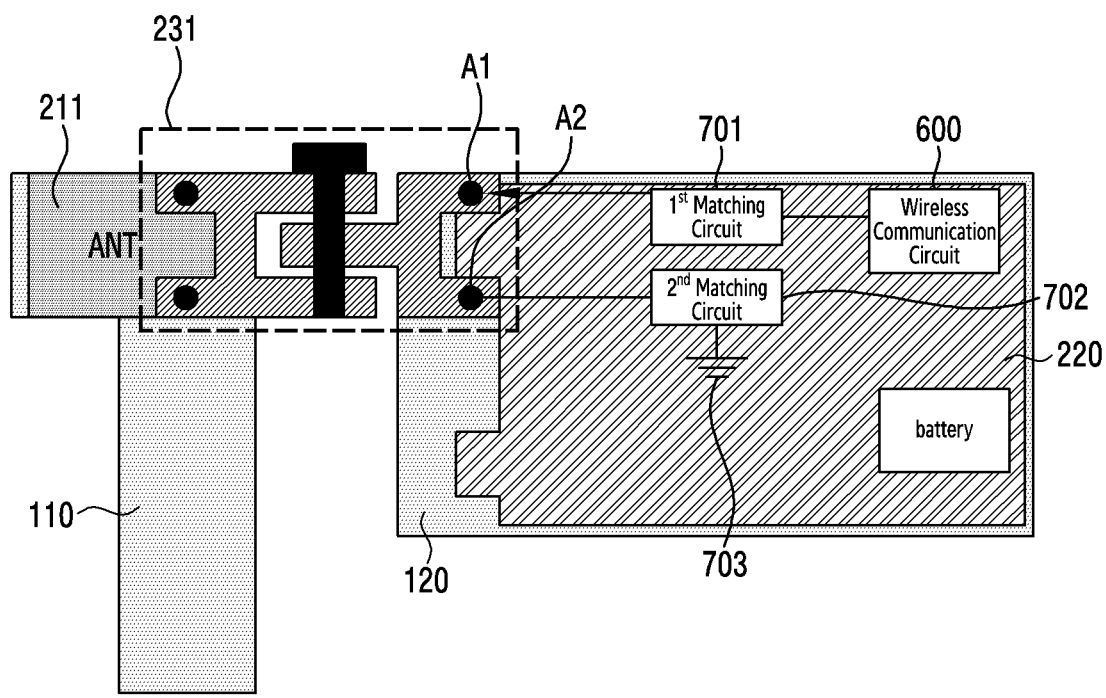
FIG. 7 is a view illustrating region A of AR glasses as shown in FIG. 2 according to another embodiment.

FIG. 7 is a view illustrating region A indicated in FIG. 2 of AR glasses according to another embodiment.

Referring to FIG. 7, the AR glasses 100 according to an embodiment may further include a ground 703 and a second matching circuit 702, unlike the AR glasses illustrated in FIG. 6.

According to an embodiment, the AR glasses 100 of FIG. 7 may further include a second matching circuit 702 and a ground 703, and the second matching circuit 702 and the ground 703 may be disposed on the PCB 220. For example, the ground 703 in the PCB 220 may be electrically connected to the first conductive hinge structure 231 via the second matching circuit 702.

According to an embodiment, the AR glasses 100 may transmit and/or receive a signal of a predetermined frequency band based on the electrical path further including the second matching circuit 702 and the ground 703.

According to an embodiment, the first conductive member 211 may be provided in the form of a loop antenna. For example, the wireless communication circuit 600 disposed in the PCB 220 may be electrically connected to a first point A1 of the first conductive hinge structure 231 via the first matching circuit 701. In addition, the ground 703 disposed in the PCB 220 may be electrically connected to a second point A2 of the first conductive hinge structure 231 via the second matching circuit 702.

According to an embodiment, the first matching circuit 701 and the second matching circuit 702 may have substantially the same function as the first matching circuit 601 of FIG. 6.

According to an embodiment, the wireless communication circuit 600 may feed power to the first point A1 via the first matching circuit 701, and the wireless communication circuit 600 may transmit and/or receive a signal of a predetermined frequency band based on a first electrical path including the first matching circuit 701, the first conductive hinge structure 231, the first conductive member 211, the second matching circuit 702 and/or the ground 703.

In FIG. 7, the point to which the wireless communication circuit 600 feeds power has been described as the first point A1 of the first conductive hinge structure 231, but the disclosure is not limited thereto. For example, the first point A1 of the first conductive hinge structure 231 may be electrically connected to the ground 703, and the second point A2 of the first conductive hinge structure 231 may be electrically connected to the wireless communication circuit 600. According to an embodiment, the wireless communication circuit 600 may feed power to the second point A2, and the wireless communication circuit 600 may transmit and/or receive a signal of a predetermined frequency band based on a second electrical path including the second matching circuit 702, the first conductive hinge structure 231, the first conductive member 211, the first matching circuit 701 and/or the ground 703.

Figure 8:
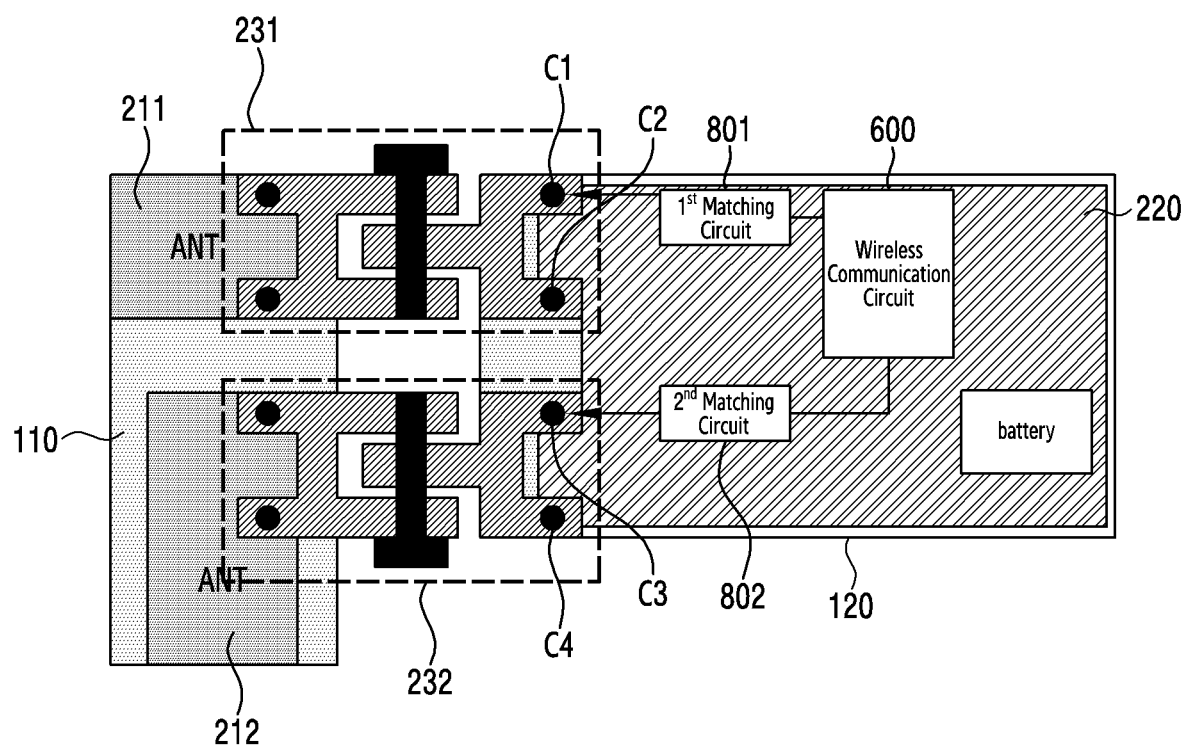
FIG. 8 is a view illustrating region A of AR glasses as shown in FIG. 2 according to another embodiment.

FIG. 8 is a view illustrating region A indicated in FIG. 2 of AR glasses according to another embodiment.

Referring to FIG. 8, the AR glasses 100 according to an embodiment may further include a second conductive member 212 and a second conductive hinge structure 232, unlike the AR glasses illustrated in FIG. 6.

According to an embodiment, the AR glasses 100 of FIG. 8 may include a first conductive member 211 and a second conductive member 212 distinct from the first conductive member 211.

According to an embodiment, the first conductive member 211 may be used as a first antenna, and the second conductive member 212 may be used as a second antenna. For example, the AR glasses 100 may transmit and/or receive a signal of a first frequency band by using a first antenna, and may transmit and/or receive a signal of a second frequency band by using a second antenna.

For example, the AR glasses 100 may transmit and/or receive a signal in a first frequency band within a range of 2.35 GHz to 2.5 GHz by using the first antenna, and may transmit and/or receive a signal of a second frequency band within 1.4 GHz to 1.6 GHz by using the second antenna.

According to an embodiment, the first antenna using the first conductive member 211 and the second antenna using the second conductive member 212 may correspond to monopole antennas. For example, the wireless communication circuit 600 disposed on the PCB 220 may be electrically connected to a first point C1 of the first conductive hinge structure via a first matching circuit 801. In addition, the wireless communication circuit 600 may be electrically connected to a third point C3 of the second conductive hinge structure 232 via a second matching circuit 802.

According to an embodiment, the first matching circuit 801 and the second matching circuit 802 of FIG. 8 may have substantially the same function as the first matching circuit 601 of FIG. 6.

According to an embodiment, the wireless communication circuit 600 may feed power to the first point C1 of the first conductive hinge structure 231 by using the first matching circuit 801, and the wireless communication circuit 600 may transmit and/or receive a signal of a predetermined frequency band based on a first electrical path including the first conductive hinge structure 231 and/or the first conductive member 211.

According to an embodiment, the wireless communication circuit 600 may feed power to the third point C3 of the second conductive hinge structure 232 via the second matching circuit 802, and the wireless communication circuit 600 may transmit and/or receive a signal of a predetermined frequency band based on a second electrical path including the second conductive hinge structure 232 and/or the first conductive member 211.

In FIG. 8, the points to which the wireless communication circuit 600 feeds power have been described as the first point C1 of the first conductive hinge structure 231 and the third point C3 of the second conductive hinge structure 232, but this is merely an example for convenience of description. According to an embodiment, the wireless communication circuit 600 may transmit and/or receive a signal of a predetermined frequency band by feeding power to various points of the first conductive hinge structure 231 and the second conductive hinge structure 232.

For example, the wireless communication circuit 600 may transmit and/or receive a signal of a predetermined frequency band based on a third electrical path by feeding power to a second point C2 of the first conductive hinge structure 231 by using the first matching circuit 801. According to an embodiment, the wireless communication circuit 600 may transmit and/or receive a signal of a predetermined frequency band based on a fourth electrical path by feeding power to a fourth point C4 of the second conductive hinge structure 232 by using the second matching circuit 802.

Figure 9:
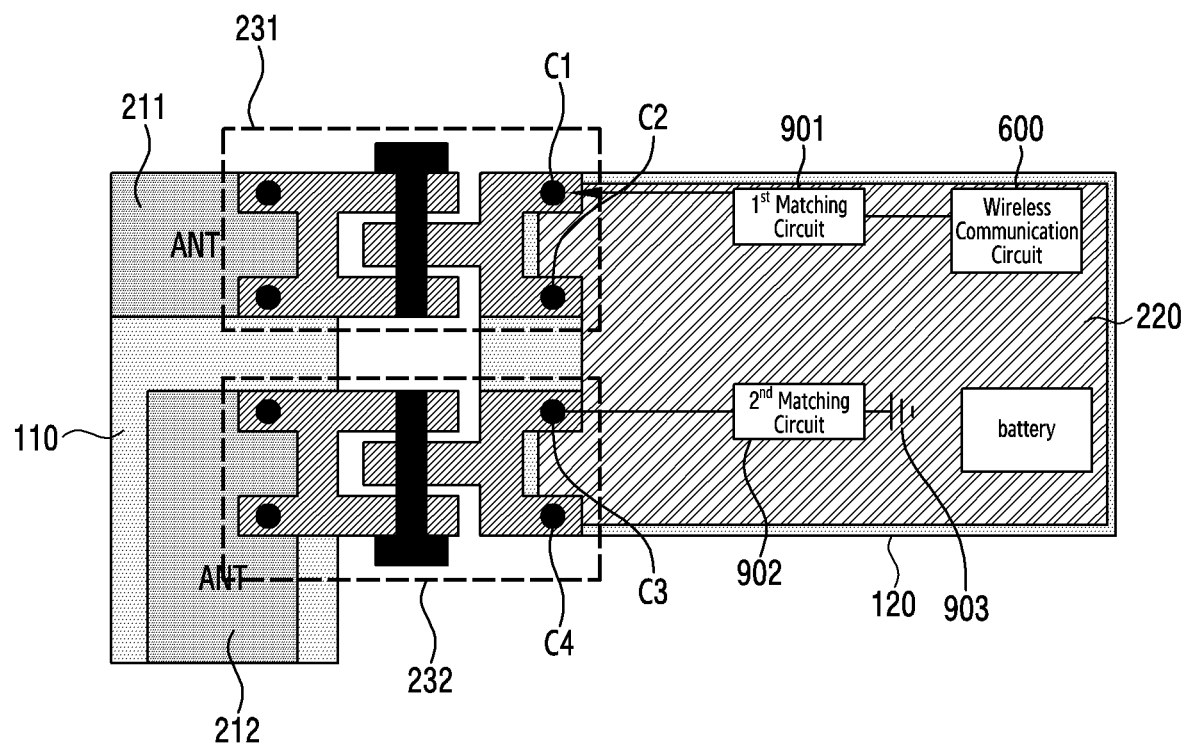
FIG. 9 is a view illustrating region A of AR glasses as shown in FIG. 2 according to another embodiment.

FIG. 9 is a view illustrating region A indicated in FIG. 2 of AR glasses according to another embodiment.

Referring to FIG. 9, the AR glasses 100 may correspond to the AR glasses 100 including an antenna including a plurality of patterns, unlike the AR glasses including the monopole antenna illustrated in FIG. 8.

According to an embodiment, the first conductive member 211 and the second conductive member 212 may be used as a first antenna different from the first conductive member 211 of FIG. 6. In other words, according to an embodiment, the first antenna may correspond to a dipole antenna, but is not limited thereto.

For example, the wireless communication circuit 600 may be electrically connected to a first point C1 of the first conductive hinge structure 231 via a first matching circuit 901. Also, according to an embodiment, a ground 903 on the PCB 220 may be electrically connected to a third point C3 of the second conductive hinge structure 232 via a second matching circuit 902.

According to an embodiment, the first matching circuit 901 and the second matching circuit 902 may have substantially the same function as the first matching circuit 601 of FIG. 6.

According to an embodiment, the wireless communication circuit 600 may feed power to the first point C1 of the first conductive hinge structure 231 by using the first matching circuit 901, and the wireless communication circuit 600 may transmit and/or receive a signal of a predetermined frequency band based on a first electrical path including the first conductive hinge structure 231, the first conductive member 211, the second matching circuit 902 electrically connected to the ground 903, the second conductive hinge structure 232 electrically connected to the second matching circuit 902 at the third point C3, and/or the second conductive member 212 electrically connected to the second conductive hinge structure 232.

In FIG. 9, the point connected to the first matching circuit 901 has been described as the first point C1 of the first conductive hinge structure 231 and the point connected to the second matching circuit 902 has been described as the third point C3, but the disclosure is not limited thereto.

For example, the first matching circuit 901 may be electrically connected to a second point C2 of the first conductive hinge structure 231, so that the wireless communication circuit 600 may feed power to the second point C2 of the first conductive hinge structure 231 via the first matching circuit 901. In addition, the ground 903 may be electrically connected to a fourth point C4 of the second conductive hinge structure 232.

According to an embodiment, the first antenna including the first matching circuit 901 electrically connected to the wireless communication circuit 600 and the second matching circuit 902 electrically connected to the ground 903 may operate as a dipole antenna.

Figure 10:
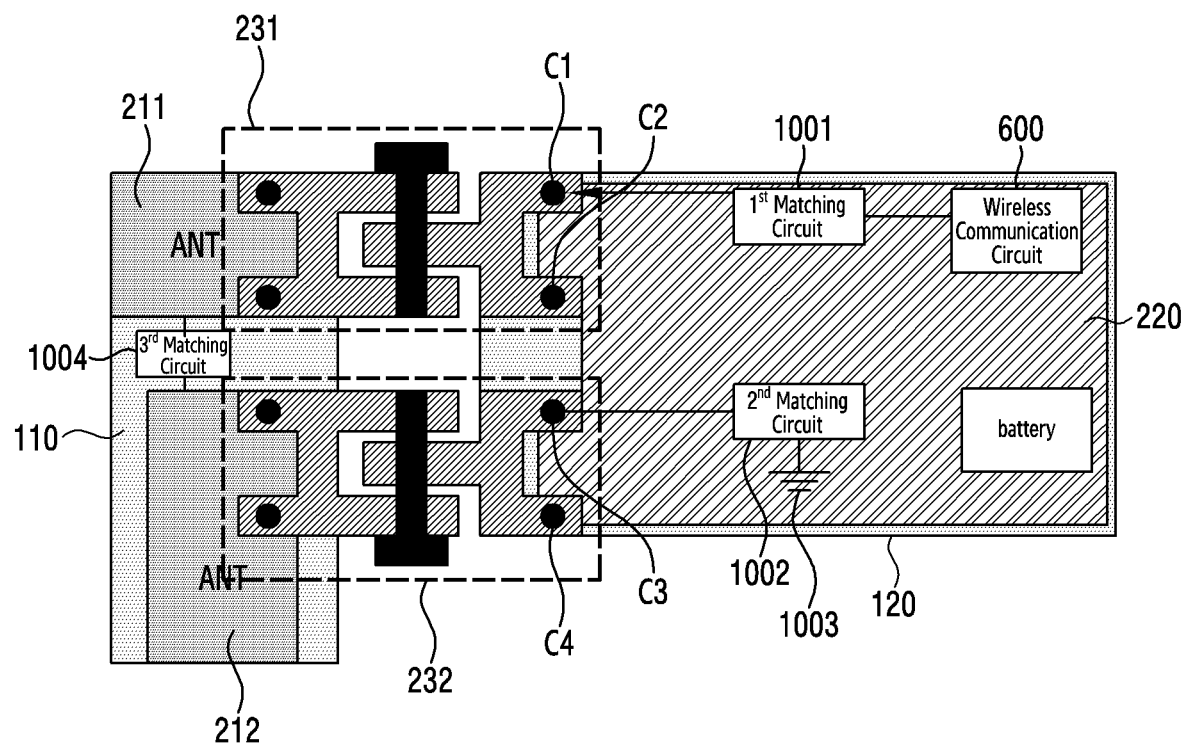
FIG. 10 is a view illustrating region A of AR glasses as shown in FIG. 2 according to another embodiment.

FIG. 10 is a view illustrating region A indicated in FIG. 2 of AR glasses according to another embodiment.

Referring to FIG. 10, the AR glasses 100 according to an embodiment may correspond to AR glasses 100 including a first antenna in the form in which the first conductive member 211 and the second conductive member 212 are electrically connected to each other, unlike the AR glasses illustrated in FIG. 9.

According to an embodiment, the AR glasses 100 may include a first conductive member 211 and a second conductive member 212 electrically connected to the first conductive member 211. According to an embodiment, the first conductive member 211 and the second conductive member 212 may be electrically connected to each other to be used as a single first antenna.

For example, by providing a third matching circuit 1004 between the first conductive member 211 and the second conductive member 212, the first conductive member 211 and the second conductive member 212 may be electrically connected to each other to be used as a single first antenna. In another example, by omitting the third matching circuit 1004 and extending a portion of the first conductive member 211 to be physically connected to a portion of the second conductive member 212, the first conductive member 211 and the second conductive member 212 may be electrically connected to each other to be used as a single first antenna. In other words, according to an embodiment, the first antenna may correspond to a loop antenna.

However, the type of the first antenna is not limited to a loop antenna. According to another embodiment, by providing the first conductive member 211 and the second conductive member 212 to be separated, the first antenna may correspond to a dipole antenna.

For example, the wireless communication circuit 600 may be electrically connected to the first point C1 or the second point C2 of the first conductive hinge structure 231 via the first matching circuit 1001. In addition, the ground 1003 disposed in the PCB 220 may be electrically connected to the third point C3 or the fourth point C4 of the second conductive hinge structure 232 via the second matching circuit 1002.

According to an embodiment, by feeding power to the first point C1 or the second point C2 by using the first matching circuit 1001, the wireless communication circuit 600 may transmit and/or receive a signal of a predetermined frequency band based on an electrical path including the first conductive hinge structure 231, the first conductive member 211, the second conductive member 212 electrically connected to the first conductive member 211, the second conductive hinge structure 232, and the second matching circuit 1002 electrically connected via the third point C3 or the fourth point C4.

Figure 11:
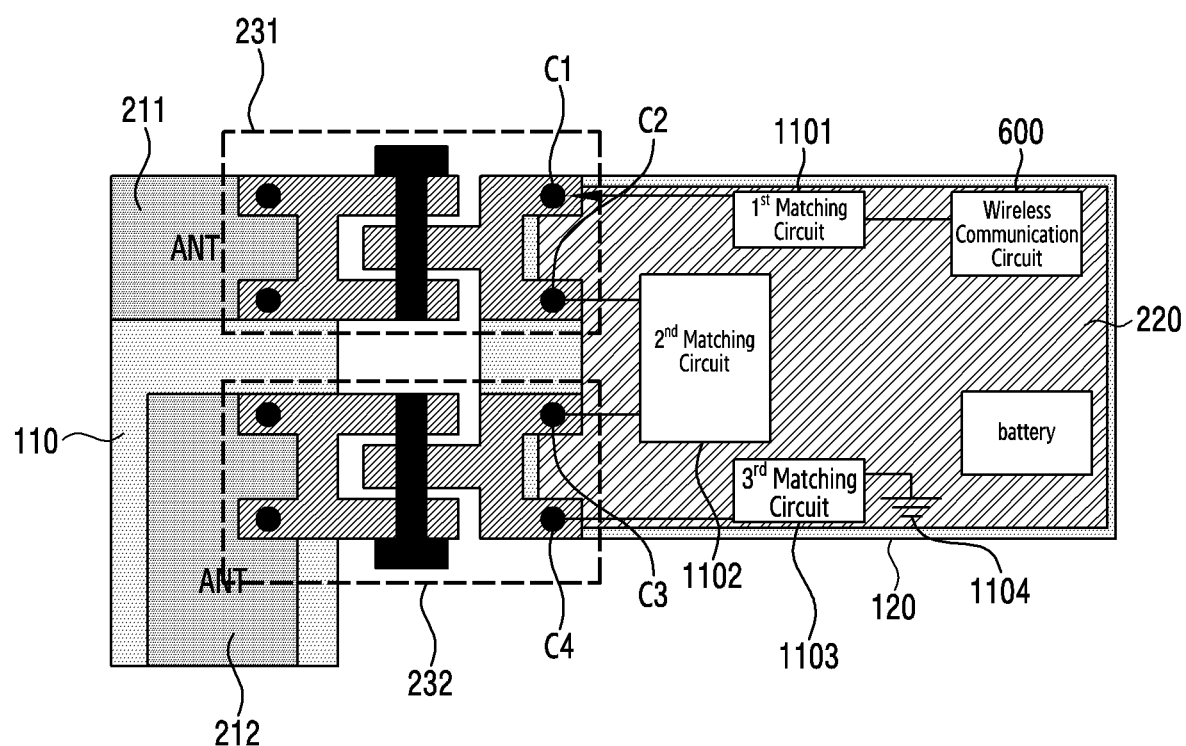
FIG. 11 is a view illustrating region A of AR glasses as shown in FIG. 2 according to another embodiment.

FIG. 11 is a view illustrating region A indicated in FIG. 2 of AR glasses according to another embodiment.

Referring to FIG. 11, the AR glasses 100 according to an embodiment may correspond to AR glasses 100 including a second antenna in the form in which the first conductive member 211 and the second conductive member 212 are not directly connected to each other, unlike the AR glasses illustrated in FIG. 10.

According to an embodiment, the AR glasses 100 may include a first conductive member 211 and a second conductive member 212 electrically connected to the first conductive member 211 by a second matching circuit 1102. According to an embodiment, the first conductive member 211 and the second conductive member 212 may be electrically connected to each other by the second matching circuit 1102 to be used as a single second antenna. In other words, the second antenna may correspond to a loop antenna.

According to an embodiment, the wireless communication circuit 600 may be electrically connected to the first point C1 of the first conductive hinge structure 231 via the first matching circuit 1101. According to an embodiment, a portion of the second matching circuit 1102 provided on the PCB 220 may be electrically connected to the second point C2 of the first conductive hinge structure 231, and another portion of the second matching circuit 1102 may be electrically connected to the third point C3 of the second conductive hinge structure 232. According to an embodiment, a ground 1104 may be electrically connected to the fourth point C4 of the second conductive hinge structure 232 via the third matching circuit 1103.

According to an embodiment, the first matching circuit 1101, the second matching circuit 1102, and the third matching circuit 1103 may have substantially the same function as the first matching circuit 601 of FIG. 6.

According to an embodiment, the wireless communication circuit 600 may receive a signal of a predetermined frequency band based on an electrical path including the first point C1, the second point C2, the third point C3, and/or the fourth point C4. For example, the wireless communication circuit 600 may feed power to the first point C1 of the first conductive hinge structure 231 by using the first matching circuit 1101. According to an embodiment, by feeding power to the first point C1 of the first matching circuit 1101, the wireless communication circuit 600 may transmit and/or receive a signal of a predetermined frequency band based on an electrical path including the first point C1 of the first conductive hinge structure 231, the first conductive member 211, the second matching circuit 1102 electrically connected to the first conductive hinge structure 231 at the second point C2, the second conductive hinge structure 232 electrically connected to the second matching circuit 1102 at the third point C3, the second conductive member 212, and the third matching circuit 1103 electrically connected to the second conductive hinge structure 232 at the fourth point C4.

Figure 12:
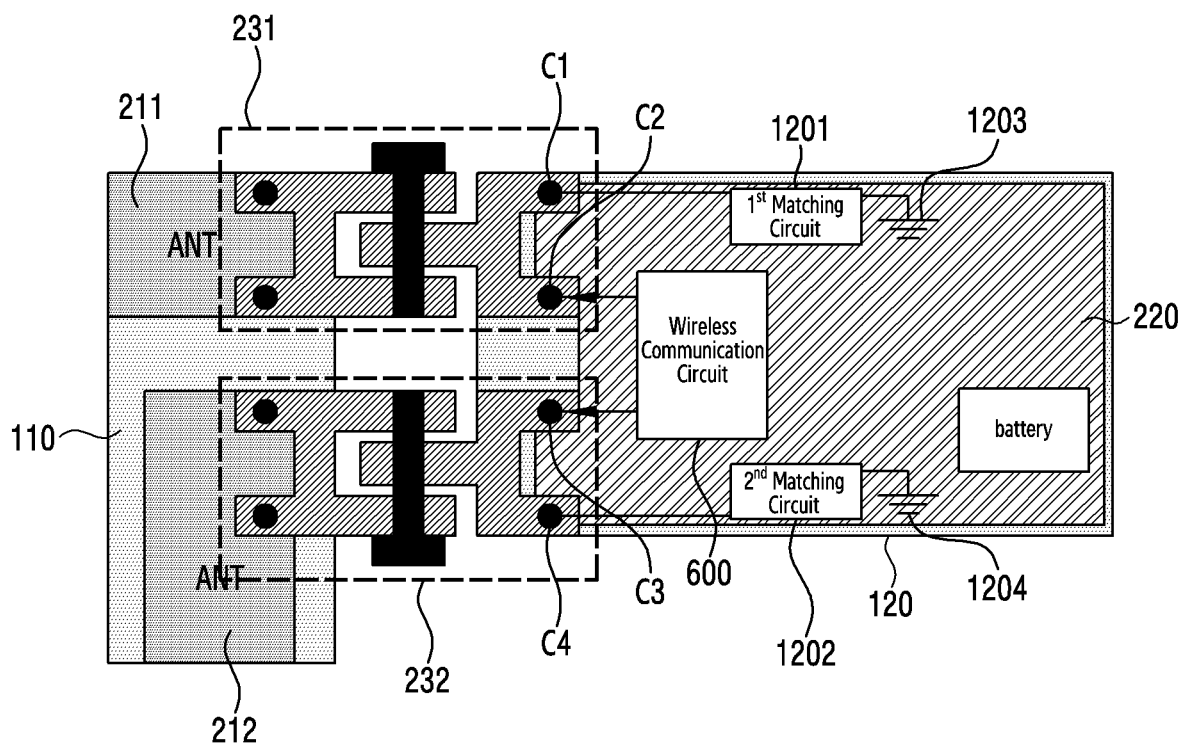
FIG. 12 is a view illustrating region A of AR glasses as shown in FIG. 2 according to another embodiment.

FIG. 12 is a view illustrating region A indicated in FIG. 2 of AR glasses, according to another embodiment.

Referring to FIG. 12, the AR glasses 100 according to an embodiment may correspond to AR glasses 100 including a first antenna and a second antenna distinct from the first antenna, unlike the AR glasses illustrated in FIG. 11.

According to an embodiment, the AR glasses 100 may include a first antenna using the first conductive member 211.

According to an embodiment, the first point C1 of the first conductive hinge structure 231 may be electrically connected to the first matching circuit 1201 electrically connected to a first ground 1203. According to an embodiment, the wireless communication circuit 600 disposed on the PCB 220 may feed power to the second point C2 of the first conductive hinge structure 231.

According to an embodiment, the AR glasses 100 may include a first antenna using the second point C2 of the first conductive hinge structure 231, the first conductive member 211, and/or the first point C1 of the first conductive hinge structure 231. For example, by feeding power to the second point C2 of the first conductive hinge structure 231, the wireless communication circuit 600 may transmit and/or receive a signal of a predetermined frequency band based on a first electrical path including the first conductive hinge structure 231 electrically connected to the wireless communication circuit 600 at the second point C2, the first conductive member 211, and/or the first matching circuit 1201 electrically connected to the second conductive hinge structure 232 at the first point C1.

However, the point to which power is fed is not limited to the second point C2, and the point electrically connected to the first ground 1203 is not limited to the first point C1. For example, the point at which power is fed may correspond to the first point C1, and the point electrically connected to the first ground 1203 may correspond to the second point C2.

According to an embodiment, the AR glasses 100 may further include a second antenna using the second conductive member 212.

For example, the wireless communication circuit 600 disposed on the PCB 220 may feed power to the third point C3 of the second conductive hinge structure 232. In addition, the fourth point C4 of the second conductive hinge structure 232 may be electrically connected to a second ground 1204 and the second matching circuit 1202.

According to an embodiment, the AR glasses 100 may include a second antenna using the third point C3 of the second conductive hinge structure 232, the second conductive member 212, and/or the second point C2 of the second conductive hinge structure 232. For example, by feeding power to the third point C3 of the second conductive hinge structure 232, the wireless communication circuit 600 may transmit and/or receive a signal of a predetermined frequency band based on a second electrical path including the second conductive hinge structure 232 electrically connected to the wireless communication circuit 600 at the third point C3, the second conductive member 212, and/or the second matching circuit 1202 electrically connected to the second conductive hinge structure 232 at the fourth point C4.

However, the point to which power is fed is not limited to the third point C3, and the point electrically connected to the second ground 1204 is not limited to the fourth point C4. For example, the point to which power is fed may correspond to the fourth point C4, and the point electrically connected to the second ground 1204 may correspond to the third point C3.

According to an embodiment, the first matching circuit 1201 and the second matching circuit 1202 may have substantially the same function as the first matching circuit 601 of FIG. 6.

Figure 13:
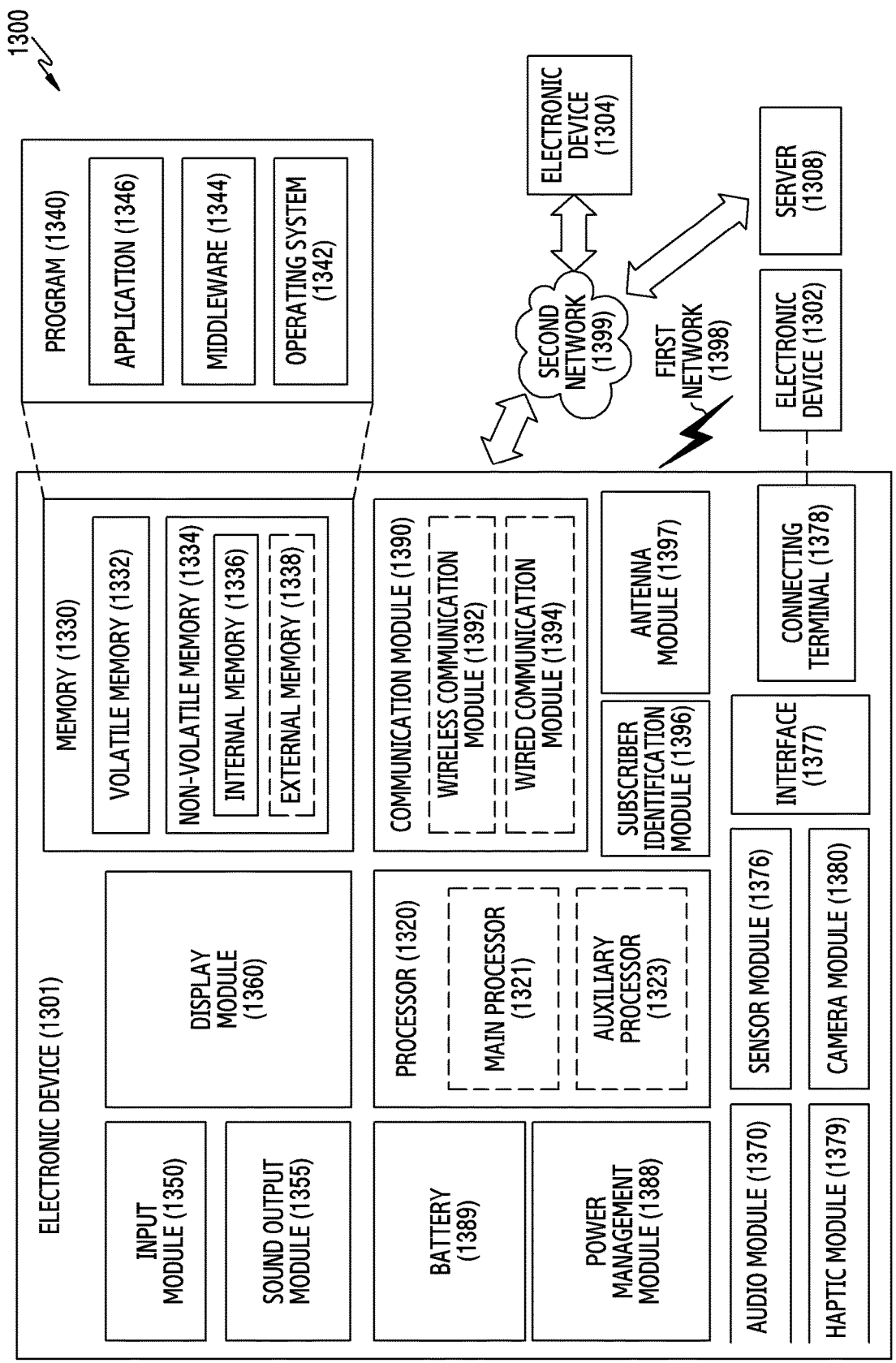
FIG. 13 is a view illustrating an electronic device according to an embodiment within a network environment.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or at least one of an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments, at least one of the components (e.g., the connecting terminal 1378) may be omitted from the electronic device 1301, or one or more other components may be added in the electronic device 1301. In some embodiments, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 may convert a sound into an electrical signal and vice versa. According to an embodiment, the audio module 1370 may obtain the sound via the input module 1350, or output the sound via the sound output module 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 or 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

Augmented reality (AR) glasses according to an embodiment may include: a main housing configured to accommodate lenses of the AR glasses, wherein at least a portion of the main housing is formed of a conductive member; a sub-housing forming a leg of the AR glasses; a PCB disposed in the sub-housing; a conductive hinge structure configured to interconnect the main housing and the sub-housing such that the sub-housing is folded or unfolded with respect to the main housing, wherein the conductive hinge structure is electrically connected to the PCB and the conductive member; and a wireless communication circuit disposed in the PCB, wherein the wireless communication circuit may be configured to transmit and/or receive a signal of a predetermined frequency band based on an electrical path including the conductive hinge structure and the conductive member by directly feeding power to the conductive hinge structure.

According to an embodiment, the conductive hinge structure may include: a first conductive connection structure attached to a portion of the main housing and including a first hole; a second conductive connection structure attached to a portion of the sub-housing and including a second hole, wherein the first hole and the second hole are aligned in a predetermined direction; and a conductive fastening member inserted into the first hole of the first conductive connection structure and the second hole of the second conductive connection structure to interconnect the main housing and the sub-housing, wherein the wireless communication circuit may be configured to transmit and/or receive a signal of the predetermined frequency band based on the electrical path further including the first conductive connection structure, the second conductive connection structure, and the conductive fastening member by directly feeding power to the second conductive connection structure.

According to an embodiment, the first conductive connection structure may include a first number of first tenons, and the second conductive connection structure includes a second number of second tenons that is one greater than the first number.

According to an embodiment, the conductive fastening member may include a screw, a rivet, and/or a washer.

According to an embodiment, the wireless communication circuit may be configured to: transmit and/or receive a signal in a first frequency band based on a first electrical path including a first conductive member of the conductive member by directly feeding power to a first conductive hinge structure of the conductive hinge structure; and transmit and/or receive a signal in a second frequency band based on a second electrical path including a second conductive member distinct from the first conductive member by directly feeding power to a second conductive hinge structure distinct from the first conductive hinge structure.

According to an embodiment, the first frequency band may correspond to a frequency band of a first range, and the second frequency band may correspond to a frequency band of a second range, wherein the second range has a value smaller than the first range.

According to an embodiment, wherein the conductive hinge structure may further include a conductive tie member electrically interconnecting the PCB and the conductive member, and the wireless communication circuit may be configured to transmit and/or receive a signal of the predetermined frequency band based on the electrical path further including the conductive tie member.

According to an embodiment, the conductive tie member may include a ball bearing and/or a protrusion extending from a portion of the conductive hinge structure.

According to an embodiment, the conductive hinge structure may include a first conductive connection structure connected to the main housing and a second conductive connection structure connected to the sub-housing, the first conductive connection structure may include a first number of third tenons that gradually increase in thickness as the third tenons extend toward the sub-housing, and a first recess provided adjacent to the third tenons, and the second conductive connection structure may include a second number of fourth tenons that gradually increase in thickness as the fourth tenons extend toward the main housing, wherein the second number is smaller than the first number, and a second recess provided adjacent to the fourth tenons.

According to an embodiment, the third tenons of the first conductive connection structure may be seated in the second recess of the second conductive connection structure, and the fourth tenons of the second conductive connection structure may be seated in the first recess of the first conductive connection structure.

According to an embodiment, the conductive hinge structure may include: a first conductive connection structure connected to the main housing; a second conductive connection structure connected to the sub-housing; and a non-conductive connection member disposed in a region in which the first conductive connection structure and the second conductive connection structure come into contact with each other, the first conductive connection structure and the second conductive connection structure may be coupled and electrically connected to each other, and the wireless communication circuit may be configured to transmit and/or receive a signal of the predetermined frequency band based on the electrical path further including the first conductive connection structure and the second conductive connection structure by directly feeding power to the second conductive connection structure of the conductive hinge structure.

According to an embodiment, the non-conductive connection member may include a non-conductive screw.

According to an embodiment, the conductive member may correspond to a loop antenna.

According to an embodiment, the conductive member may correspond to a dipole antenna or a monopole antenna.

According to an embodiment, the predetermined frequency band may include a frequency band within 2.35 GHz to 2.5 GHz.

According to various embodiments, augmented reality (AR) glasses may include: a main housing configured to accommodate lenses of the AR glasses, wherein at least a portion of the main housing is formed of a conductive member; a sub-housing forming a leg of the AR glasses; a PCB disposed in the sub-housing, wherein the PCB includes a ground; a conductive hinge structure configured to interconnect the main housing and the sub-housing such that the sub-housing is folded or unfolded with respect to the main housing, wherein the conductive hinge structure is electrically connected to the PCB and the conductive member; and a wireless communication circuit disposed in the PCB, wherein the conductive hinge structure may include: a first conductive hinge structure connected to one end of the conductive member; and a second conductive hinge structure connected to another end of the conductive member and electrically connected to the ground, and wherein the wireless communication circuit may be configured to transmit and/or receive a signal of a predetermined frequency band based on an electrical path including the first conductive hinge structure, the first conductive member, and the second conductive hinge structure by directly feeding power to the first conductive hinge structure.

According to an embodiment, the first conductive hinge structure and the second conductive hinge structure may include: a first conductive connection structure attached to a portion of the main housing and including a first hole; a second conductive connection structure attached to a portion of the sub-housing and including a second hole, wherein the first hole and the second hole are aligned in a predetermined direction; and a conductive fastening member inserted into the first hole of the first conductive connection structure and the second hole of the second conductive connection structure to interconnect the main housing and the sub-housing, wherein the wireless communication circuit may be configured to transmit and/or receive a signal of the predetermined frequency band based on the electrical path further including the first conductive connection structure, the second conductive connection structure, and the conductive fastening member by directly feeding power to the second conductive connection structure.

According to an embodiment, the conductive fastening member may include a screw, a rivet, and/or a washer.

According to an embodiment, the first conductive connection structure may include a first number of first tenons, and the second conductive connection structure includes a second number of second tenons that is one greater than the first number. According to an embodiment, the conductive member may correspond to a loop antenna.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. Augmented reality (AR) glasses comprising:
    a main housing configured to accommodate lenses of the AR glasses, wherein at least a portion of the main housing includes a conductive member configured to operate as an antenna;
    a sub-housing forming a leg of the AR glasses;
    a printed circuit board (PCB) disposed in the sub-housing;
    a non-radiative conductive hinge structure configured to interconnect the main housing and the sub-housing such that the sub-housing is foldable with respect to the main housing, wherein the non-radiative conductive hinge structure electrically connects the PCB and the conductive member; and a wireless communication circuit disposed in the sub-housing,
wherein the non-radiative conductive hinge structure comprising:
a first conductive connection structure attached to a portion of the main housing and including a first hole;
a second conductive connection structure attached to a portion of the sub-housing and including a second hole, wherein the first hole and the second hole are aligned in a predetermined direction; and
a conductive fastening member inserted into the first hole of the first conductive connection structure and the second hole of the second conductive connection structure to interconnect the main housing and the sub-housing,
wherein the wireless communication circuit is configured to transmit and/or receive a signal of a predetermined frequency band via the conductive member based on an electrical path including the non-radiative conductive hinge structure and the conductive member by directly feeding power to the second conductive connection structure.

2. The AR glasses of claim 1,
wherein the wireless communication circuit is configured to transmit and/or receive the signal of the predetermined frequency band based on the electrical path further including the first conductive connection structure, the second conductive connection structure, and the conductive fastening member by directly feeding power to the second conductive connection structure.

3. The AR glasses of claim 2, wherein the first conductive connection structure includes a first number of first tenons, and
the second conductive connection structure includes a second number of second tenons that is one less than the first number.

4. The AR glasses of claim 2, wherein the conductive fastening member comprises at least one of a screw, a rivet, or a washer.

5. The AR glasses of claim 1, wherein the wireless communication circuit is configured to:
transmit and/or receive a signal in a first frequency band based on a first electrical path including a first conductive member of the conductive member by directly feeding power to a first conductive hinge structure of the non-radiative conductive hinge structure; and
transmit and/or receive a signal in a second frequency band based on a second electrical path including a second conductive member distinct from the first conductive member by directly feeding power to a second conductive hinge structure distinct from the first conductive hinge structure.

6. The AR glasses of claim 5, wherein the first frequency band corresponds to a frequency band of a first range, and
the second frequency band corresponds to a frequency band of a second range, wherein the second range is different from the first range.

7. The AR glasses of claim 1, wherein the non-radiative conductive hinge structure further includes a conductive tie member electrically interconnecting the PCB and the conductive member, and
the wireless communication circuit is configured to transmit and/or receive a signal of the predetermined frequency band based on the electrical path further including the conductive tie member.

8. The AR glasses of claim 7, wherein the conductive tie member includes at least one of a ball bearing and a protrusion extending from a portion of the non-radiative conductive hinge structure.

9. The AR glasses of claim 3, wherein the non-radiative conductive hinge structure includes a first conductive connection structure connected to the main housing and a second conductive connection structure connected to the sub-housing,
the first conductive connection structure includes a first number of third tenons that gradually increase in thickness as the third tenons extend toward the sub-housing, and a first recess provided adjacent to the tenons, and
the second conductive connection structure includes a second number of fourth tenons that gradually increase in thickness as the fourth tenons extend toward the main housing, wherein the second number is smaller than the first number, and a second recess provided adjacent to the fourth tenons.

10. The AR glasses of claim 9, wherein the third tenons of the first conductive connection structure are seated in the second recess of the second conductive connection structure, and
the fourth tenons of the second conductive connection structure are seated in the first recess of the first conductive connection structure.

11. The AR glasses of claim 1, wherein the non-radiative conductive hinge structure includes:
a first conductive connection structure connected to the main housing;
a second conductive connection structure connected to the sub-housing; and
a non-conductive connection member disposed in a region in which the first conductive connection structure and the second conductive connection structure come into contact with each other,
the first conductive connection structure and the second conductive connection structure are coupled and electrically connected to each other, and
the wireless communication circuit is configured to transmit and/or receive a signal of the predetermined frequency band based on the electrical path further including the first conductive connection structure and the second conductive connection structure by directly feeding power to the second conductive connection structure of the non-radiative conductive hinge structure.

12. The AR glasses of claim 11, wherein the non-conductive connection member includes a non-conductive fastener.

13. The AR glasses of claim 1, wherein the conductive member comprises a loop antenna.

14. The AR glass of claim 1, wherein the conductive member comprises one of a dipole antenna or a monopole antenna.

15. The AR glass of claim 1, wherein the predetermined frequency band includes a frequency band within 2.35 GHz to 2.5 GHz.

16. Augmented reality (AR) glasses comprising:
a main housing configured to accommodate lenses of the AR glasses, wherein at least a portion of the main housing is formed of a conductive member;
a sub-housing forming a leg of the AR glasses;
a printed circuit board (PCB) disposed in the sub-housing, wherein the PCB includes a ground;
a conductive hinge structure configured to interconnect the main housing and the sub-housing such that the sub-housing is foldable with respect to the main housing, wherein the conductive hinge structure is electrically connected to the PCB and the conductive member; and a wireless communication circuit disposed in the sub-housing, wherein the conductive hinge structure includes:
- a first conductive hinge structure connected to one end of the conductive member; and
- a second conductive hinge structure connected to another end of the conductive member and electrically connected to the ground, and wherein the wireless communication circuit is configured to transmit and/or receive a signal of a predetermined frequency band based on an electrical path including the first conductive hinge structure, the conductive member, and the second conductive hinge structure by directly feeding power to the first conductive hinge structure.

17. The AR glasses of claim 16, wherein each of the first conductive hinge structure and the second conductive hinge structure include:
- a first conductive connection structure attached to a portion of the main housing and including a first hole;
- a second conductive connection structure attached to a portion of the sub-housing and including a second hole, wherein the first hole and the second hole are aligned in a predetermined direction; and
- a conductive fastening member inserted into the first hole of the first conductive connection structure and the second hole of the second conductive connection structure to interconnect the main housing and the sub-housing, wherein the wireless communication circuit is configured to transmit and/or receive the signal of the predetermined frequency band based on the electrical path further including the first conductive connection structure, the second conductive connection structure, and the conductive fastening member by directly feeding power to the second conductive connection structure.

18. The AR glasses of claim 17, wherein the conductive fastening member comprises at least one of a screw, a rivet, or a washer.

19. The AR glasses of claim 17, wherein the first conductive connection structure includes a first number of first tenons, and
the second conductive connection structure includes a second number of second tenons that is one less than the first number.

20. The AR glasses of claim 16, wherein the conductive member comprises a loop antenna.

* * * * *